(12) United States Patent
Smirnov et al.

(10) Patent No.: US 11,816,858 B2
(45) Date of Patent: Nov. 14, 2023

(54) NOISE REDUCTION CIRCUIT FOR DUAL-MODE IMAGE FUSION ARCHITECTURE

(71) Applicant: Apple Inc., Cupertino, CA (US)

(72) Inventors: Maxim Smirnov, Portland, OR (US); Sheng Lin, San Jose, CA (US)

(73) Assignee: APPLE INC., Cupertino, CA (US)

( * ) Notice: Subject to any disclaimer, the term of this patent is extended or adjusted under 35 U.S.C. 154(b) by 210 days.

(21) Appl. No.: 17/173,094

(22) Filed: Feb. 10, 2021

(65) Prior Publication Data

US 2022/0254050 A1    Aug. 11, 2022

(51) Int. Cl.
*G06T 7/90* (2017.01)
*G06T 3/40* (2006.01)
*G06T 5/00* (2006.01)
*G06T 7/70* (2017.01)

(52) U.S. Cl.
CPC .............. *G06T 7/70* (2017.01); *G06T 3/4007* (2013.01); *G06T 5/002* (2013.01); *G06T 7/90* (2017.01); *G06T 2207/20028* (2013.01)

(58) Field of Classification Search
CPC ......... G06T 7/70; G06T 3/4007; G06T 5/002; G06T 7/90; G06T 2207/20028; G06T 3/4015
See application file for complete search history.

(56) References Cited

U.S. PATENT DOCUMENTS

| | | | | |
|---|---|---|---|---|
| 7,418,130 | B2* | 8/2008 | Keshet | G06T 5/005 348/E9.003 |
| 8,965,141 | B2* | 2/2015 | Jiang | G06T 5/002 382/261 |
| 9,654,700 | B2 | 5/2017 | Kovtun et al. | |
| 10,134,110 | B1 | 11/2018 | Liu et al. | |
| 2010/0183240 | A1* | 7/2010 | Hiraga | G06T 7/13 382/266 |
| 2015/0302558 | A1* | 10/2015 | Kobayashi | G06T 5/002 382/167 |
| 2018/0315172 | A1* | 11/2018 | Smirnov | G06T 5/20 |
| 2020/0007760 | A1 | 1/2020 | Yokokawa et al. | |

* cited by examiner

*Primary Examiner* — Vu Le
*Assistant Examiner* — Anderson M Speed
(74) *Attorney, Agent, or Firm* — Sterne, Kessler, Goldstein & Fox P.L.L.C.

(57) ABSTRACT

Embodiments relate to an image processing circuit comprising a noise reduction circuit configurable to perform bilateral filtering on demosaiced and resampled image data, or on raw image data, based on the operating mode of the image processing circuit. The noise reduction circuit filters received image data based upon directional taps, by selecting, for each pixel, a set of neighbor pixels, and comparing values of the set of neighbor pixels to determine whether the pixel lies on a directional edge. For raw images, the noise reduction circuit selects the set of neighbor pixels to include a plurality of pixels of the same color channel as the pixel, and one or more additional pixels of a different color channel, where color values for the one or more additional pixels are determined by interpolating color values of two or more adjacent pixels of the same color channel as the pixel.

20 Claims, 17 Drawing Sheets

NOISE REDUCTION CIRCUIT FOR DUAL-MODE IMAGE FUSION ARCHITECTURE

BACKGROUND

1. Field of the Disclosure

The present disclosure relates to a circuit for processing images and more specifically to fusion of different images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments of the present disclosure relate to an image processing circuit that performs image fusion (e.g., temporal fusion) and noise reduction on received images in at least two different modes, including a first mode for fusing demosaiced and downscaled image data, and a second mode for fusing raw image data. The image processing circuit comprises a noise reduction circuit configurable to perform bilateral filtering on processed image data of fused image pyramids generated from demosaiced and resampled image data, or on raw image data of fused raw image pyramids, based on the operating mode of the image processing circuit. The noise reduction circuit is configured to filter each pixel of received image data based upon a set of neighbor pixels of a surrounding pixel block selected based upon the image data type and pixel color channel.

In some embodiments, an image fusion processor comprises a photometric distance calculator circuit and a bilateral filter circuit. The photometric distance calculator circuit determines distances between a center pixel of a pixel block to other pixels of the pixel block. The pixel block includes raw image data associated with a raw image. The bilateral filter circuit determines a set of neighbor pixels of the center pixel of the pixel block, based upon a color of the center pixel. One or more pixels of the set of neighbor pixels are of a different color from the center pixel. For each of the one or more pixels of the set of neighbor pixels, the bilateral filter circuit interpolates a color value of the pixel based upon at least two adjacent pixels of the pixel block that are of the same color as the center pixel, and determine a set of filter taps for the set of neighbor pixels, based upon one or more distances determined by the photometric distance calculator circuit between the center pixel and the set of neighbor pixels. The bilateral filter circuit obtains a filtered pixel value of the center pixel, based on the determined set of filter taps and color values of the set of neighbor pixels.

Figure 1:
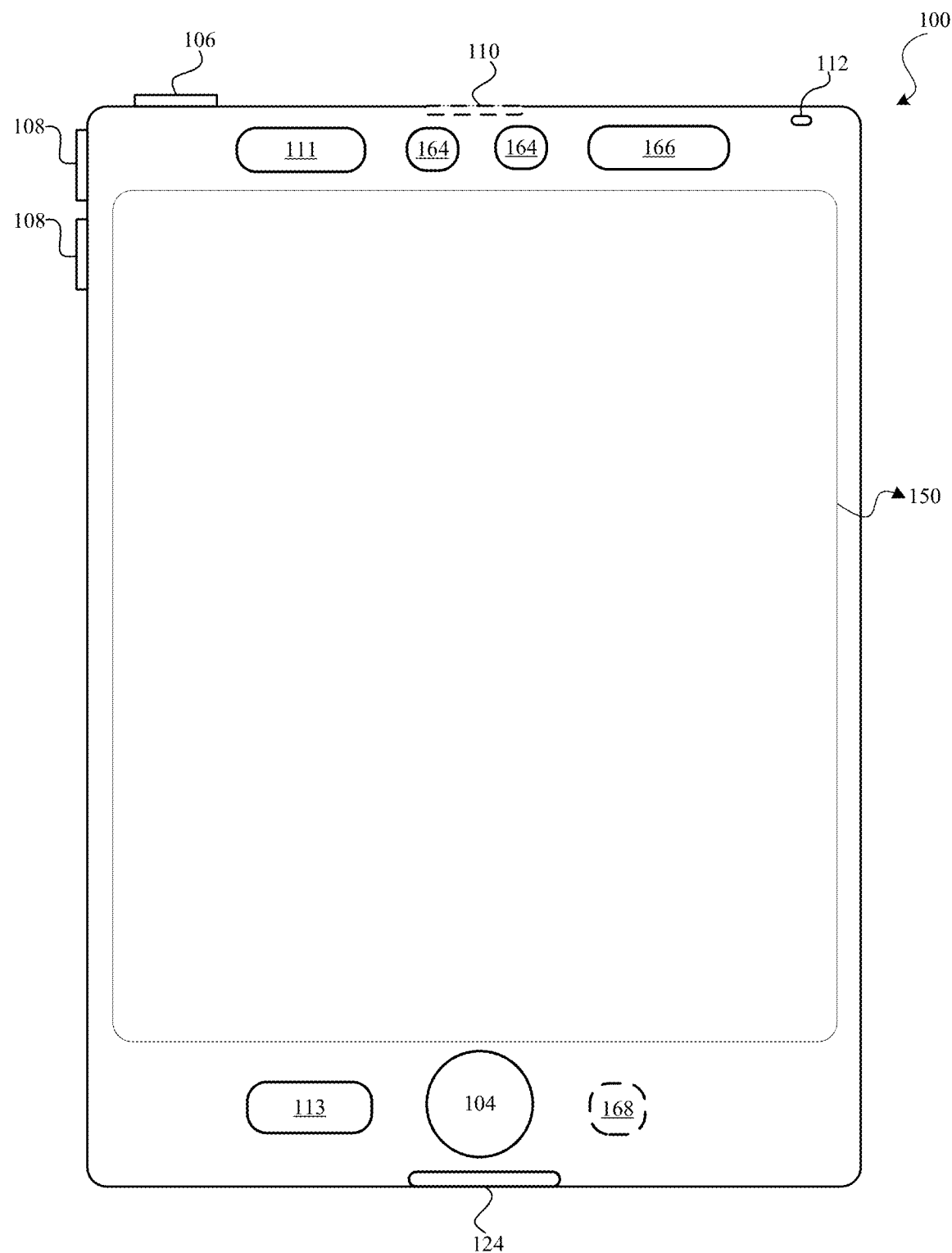
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image processing circuit operable to perform image fusion on images in at least two different modes, including a first mode for fusing demosaiced and downscaled image data, and a second mode for fusing raw image data. Raw image data is received from an image sensor in Bayer format. Raw image data may be demosaiced and resampled prior to undergoing image fusion. By performing these operations prior to image fusion, a memory footprint for performing image fusion may be reduced, as well as requiring less memory bandwidth and reduced power consumption. Alternatively, image fusion is performed on the raw Bayer image data where demosaicing and resampling occurs after a fused raw Bayer image is generated to ensure that the quality of the image being processed is of a higher quality. For example, in some embodiments, image fusion in raw image mode is performed using 4k image data, while image fusion in processed image mode, due to already being downscaled, may be performed using 1080p image data.

The image processing circuit comprises a noise reduction circuit configurable to perform bilateral filtering on processed image data of fused image pyramids generated from demosaiced and resampled image data, or on raw image data of fused raw image pyramids, based on the operating mode of the image processing circuit. The noise reduction circuit is configured to filter received image data based upon directional filter coefficients/taps, by determining, for each pixel, whether the pixel lies on a directional edge by analyzing pixels of a surrounding pixel block. The noise reduction circuit selects the specific pixels of the pixel block analyzed to determine the directional filter taps based on the type of image data (e.g., processed image data or raw image data) and color channel of pixels. In raw image mode, the selected pixels comprise a plurality of pixels of the same color channel as the center pixel of the pixel block, and one or more additional pixels of a different color channel, where color values for the additional pixels are determined by interpolating color values of two or more pixels of the pixel block adjacent to each of the additional pixels that are of the same color channel as the center pixel. The noise reduction circuit utilizes different sets of filter kernels for photometric distance calculation and filtering, based upon the image data type and pixel color channel.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
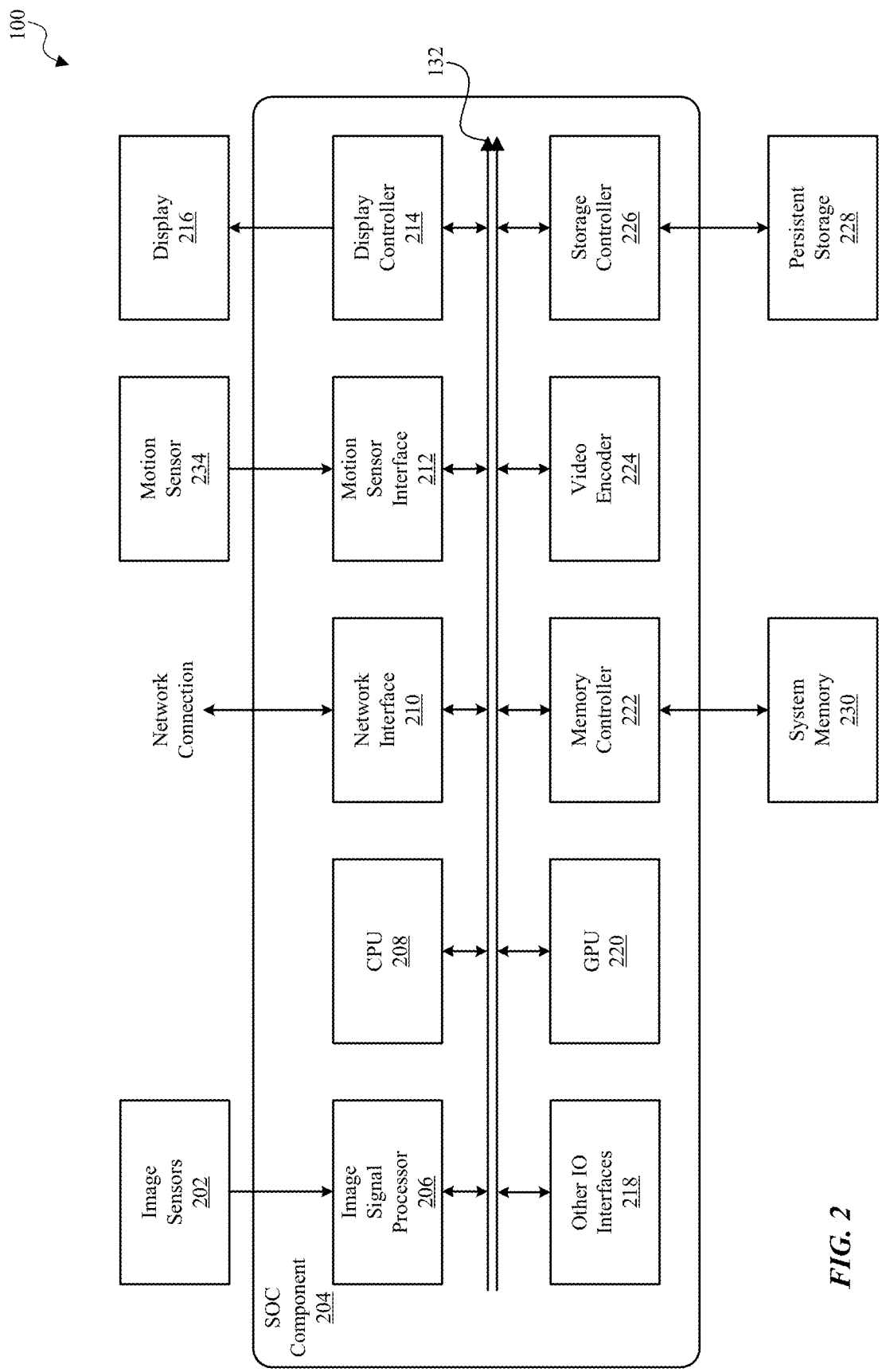
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
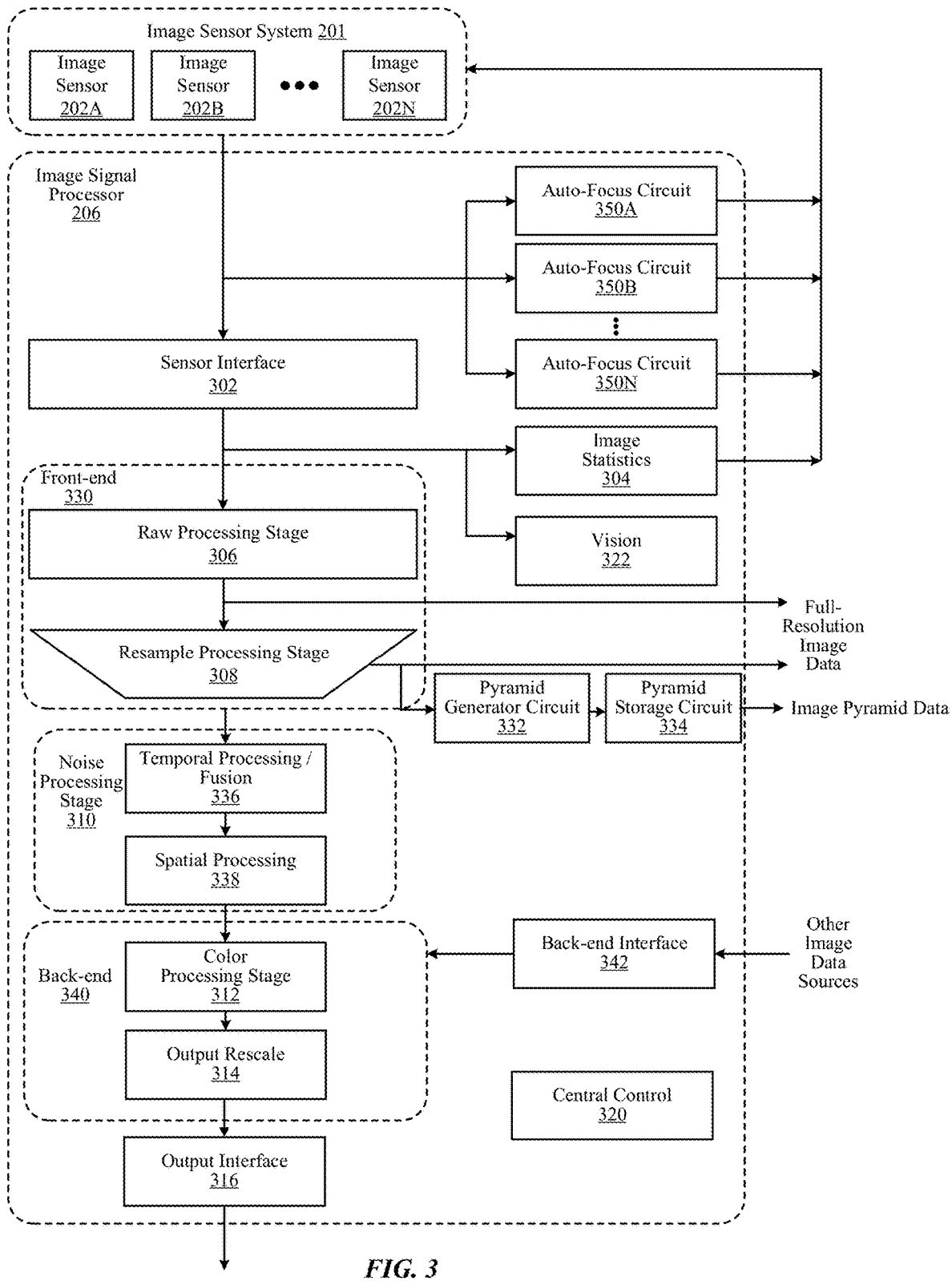
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, noise-processing stage 310, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more of the noise processing stage 310 and/or back-end pipeline stages 340 may process image data at a different rate less than the initial data rate. For example, in the embodiment of FIG. 3, back-end pipeline stages 340 (e.g., color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end stages 330, noise processing stage 310, and back-end stages 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Pyramid generator circuit 332 is a circuit configured to receive processed image output by the resample processing stage 308, and generate an image pyramid based upon the received image. Each generated pyramid comprises multiple downscaled images (also referred to as levels, scales, or octaves) each having a different resolution obtained by sequentially downscaling a received image. In some embodiments, each downscaled image of the pyramid includes the multiple color components (e.g., Y, Cr, Cb color components). In addition, the pyramid includes an unscaled single color version (e.g., Y luma component only) of the image. As such, the generated pyramid may include a plurality of stages 0 through n (e.g., 7 stages, corresponding to stages 0 through 6), where stage 0 corresponds to the unscaled single color image (e.g., Y component only), while stages 1 through n correspond to sequentially downscaled images with multiple color components (e.g., YCrCb), and the value of n (e.g., 6) corresponds to a number of downscaled levels. In some embodiments, each sequential stage of downscaling corresponds to downscaling each of the width and height by a factor of 2 relative to a previous stage. The generated pyramid thus comprises low frequency components of the downscaled versions of the received image and a low frequency component of an unscaled single color version (e.g., luma component) of the received image.

Pyramid storage circuit 334 is configured to receive an image pyramid (e.g., generated by the pyramid generator circuit 332) and store the image pyramid in a memory. In some embodiments, the pyramid storage circuit 334 stores a received image pyramid based upon how the image pyramid will be used for subsequent processing. For example, in some embodiments, a first image pyramid corresponding to a first image is fused with a second image pyramid corresponding to a second image, wherein the first or second image pyramid (corresponding to a "secondary" image) is warped based upon one or more warping parameters to align with the other image pyramid (corresponding to a "primary" image). In some embodiments, where the image pyramid is to be warped during an image fusion process, the pyramid storage circuit 334 converts the image pyramid into a tile format for storage. On the other hand, if the image pyramid does not need to be warped, the pyramid storage circuit 334 may cause the image pyramid to be stored in raster format. In some embodiments, the pyramid storage circuit 334 comprises a direct memory access (DMA) circuit, which may store the image pyramid (in raster or tile format) within persistent memory (e.g., a DRAM) or within a memory cache (e.g., an SRAM buffer that retains a portion of the image pyramid in the main system memory). In some embodiments, if only a portion of the image pyramid is to be stored (e.g., the image pyramid is to be immediately used for image fusion, such that only a portion of the pyramid needs to be stored at a time), then the DMA may store the image pyramid in memory cache, which acts as a buffer between the pyramid generator circuit 332 and the subsequent processing circuits (e.g., an image fusion circuit implemented as part of a noise processing stage 310). On the other hand, if the entire image pyramid is to be stored, and/or stored for a length of time, then the image pyramid is stored in DRAM.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the preprocessed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. In some embodiments, the noise processing stage 310 comprises a temporal processing and fusion circuit 336 and a spatial processing circuit 338, configured to perform temporal filtering and spatial filtering, respectively, on received image data. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. For example, the noise processing stage 310 may perform image fusion by warping and fusing an image frame with a reference frame. In some embodiments, image fusion is performed using image pyramids of received image frames (e.g., generated by the pyramid generator circuit 332). In other embodiments, such as that illustrated in FIG. 4, spatial noise filtering may not be included as part of the temporal loop for temporal filtering (e.g., the spatial noise filter is applied to an image frame after it is stored as a reference image frame and thus the reference frame is not spatially filtered).

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3. Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
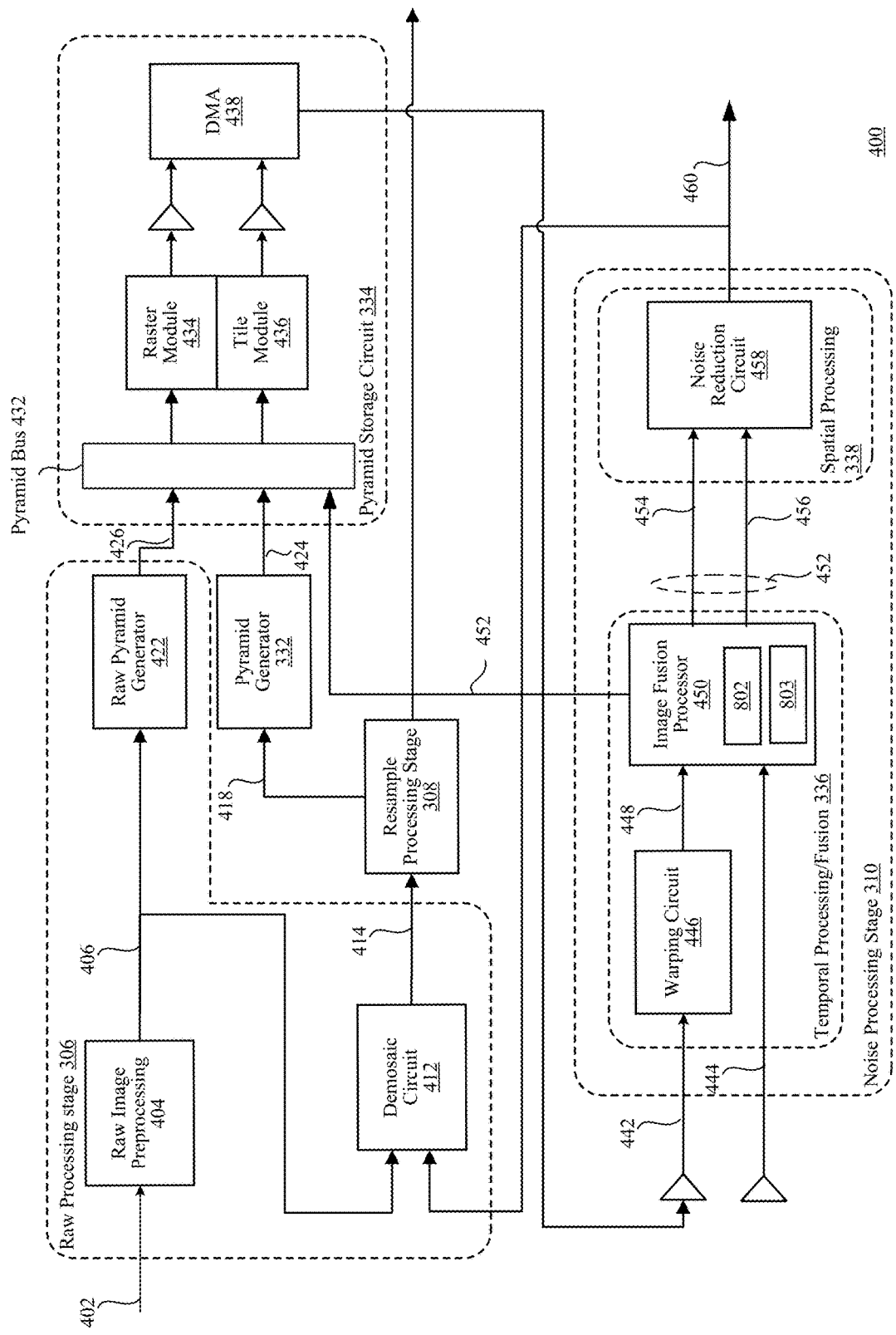
FIG. 4 is a block diagram illustrating a portion of the image processing pipeline including circuitry for image fusion, according to one embodiment.

FIG. 4 is a block diagram illustrating a portion of the image processing pipeline including circuitry for dual-mode image fusion, according to one embodiment. The image fusion circuit 400 may be implemented as part of the vision module 322, the front-end 330 (e.g., raw processing stage 306 and resample processing stage 308), pyramid generation circuit 332, pyramid storage circuit 334, and/or noise processing stage 310 illustrated in FIG. 3. For example, in some embodiments, the vision module 322 performs feature extraction from received images (e.g., based on keypoints of the received images) used for warping generated image pyramids, while pyramid generation is performed by the raw processing stage 306 (for generating raw image pyramids) and the pyramid generation circuit 332, and image fusion and noise reduction are performed at the back-end 340 (e.g., noise processing stage 310).

The image fusion circuit 400 is configurable to perform image fusion applications in at least two different modes, including a first processed image mode (e.g., YCC mode) in which raw image data is demosaiced and resampled prior to image pyramid generation and image fusion, and a second raw image mode in which image pyramid generation and image fusion is performed using received raw image data (e.g., Bayer image data). By performing image fusion using the raw image data, the fused image is generated with a greater amount of accuracy relative to the original image data. However, doing so may consume a larger memory footprint, which may not be practical for all applications. On the other hand, performing image fusion using the processed image mode may consume less memory when the demosaiced image is downscaled/resampled, but may result in fused images that are less accurate. As such, by being configurable to perform image fusion in either mode, the image fusion circuit 400 is able to generate fused images for a variety of different applications with different requirements for image signal accuracy and memory use. In addition, within each mode, the image fusion circuit 400 may implement a plurality of different types of fusion schemes, including bypass (e.g., no fusion), two-frame fusion (including but not limited to generation of HDR images), temporal filtering such as infinite impulse response (IIR) or finite impulse response (FIR), and/or the like. The image fusion functions by the image fusion circuit 400 on received images may be referred to as "temporal processing." The temporally processed images may then be received by a noise reduction circuit for performing "spatial processing" of the image. As such, the image fusion circuit 400 is used to perform "temporal-then-spatial" processing on received images.

Figure 5A:
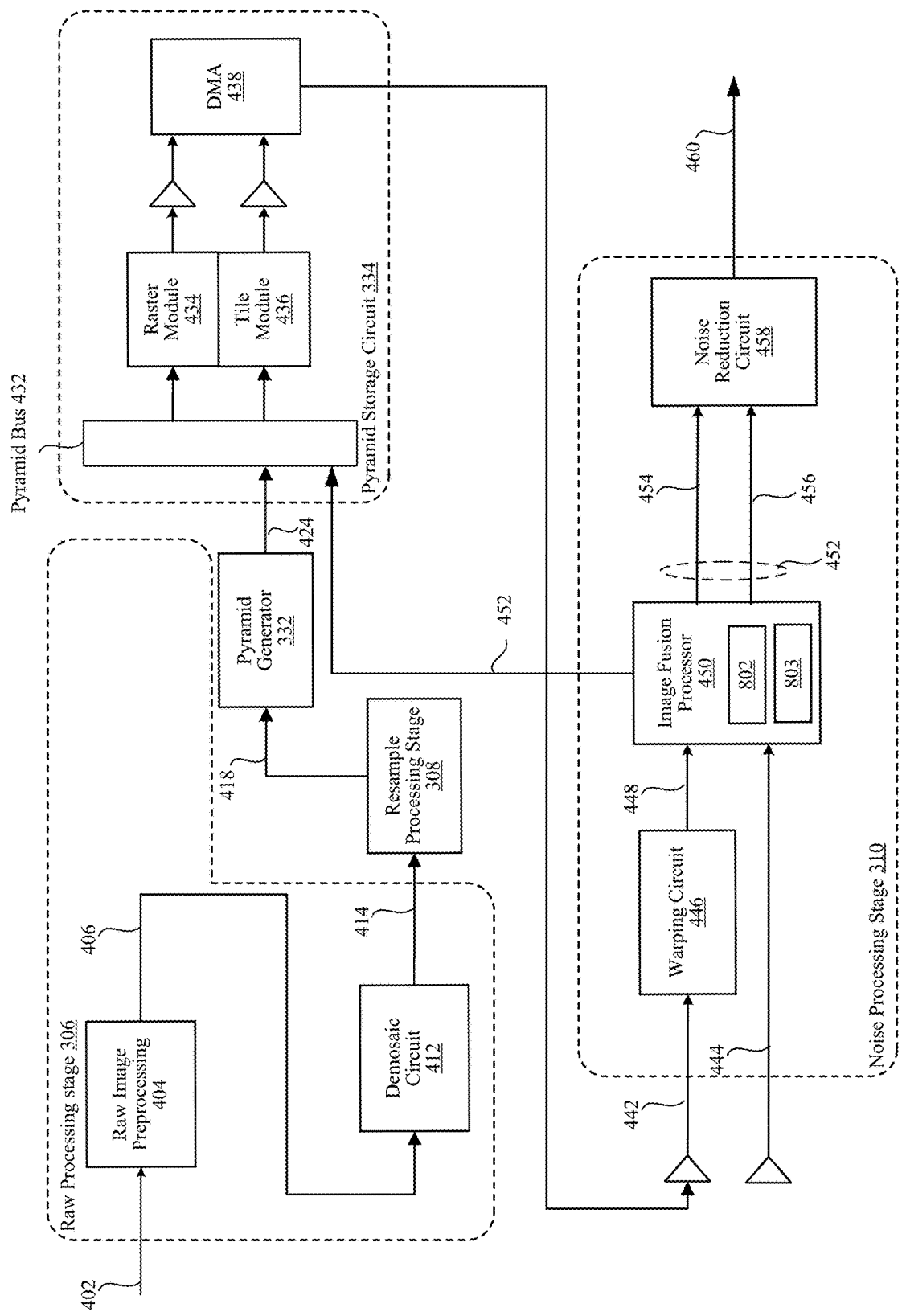
FIG. 5A illustrates a high level diagram of how the image fusion circuit operates in the first processed image mode, in accordance with some embodiments.
Figure 5B:
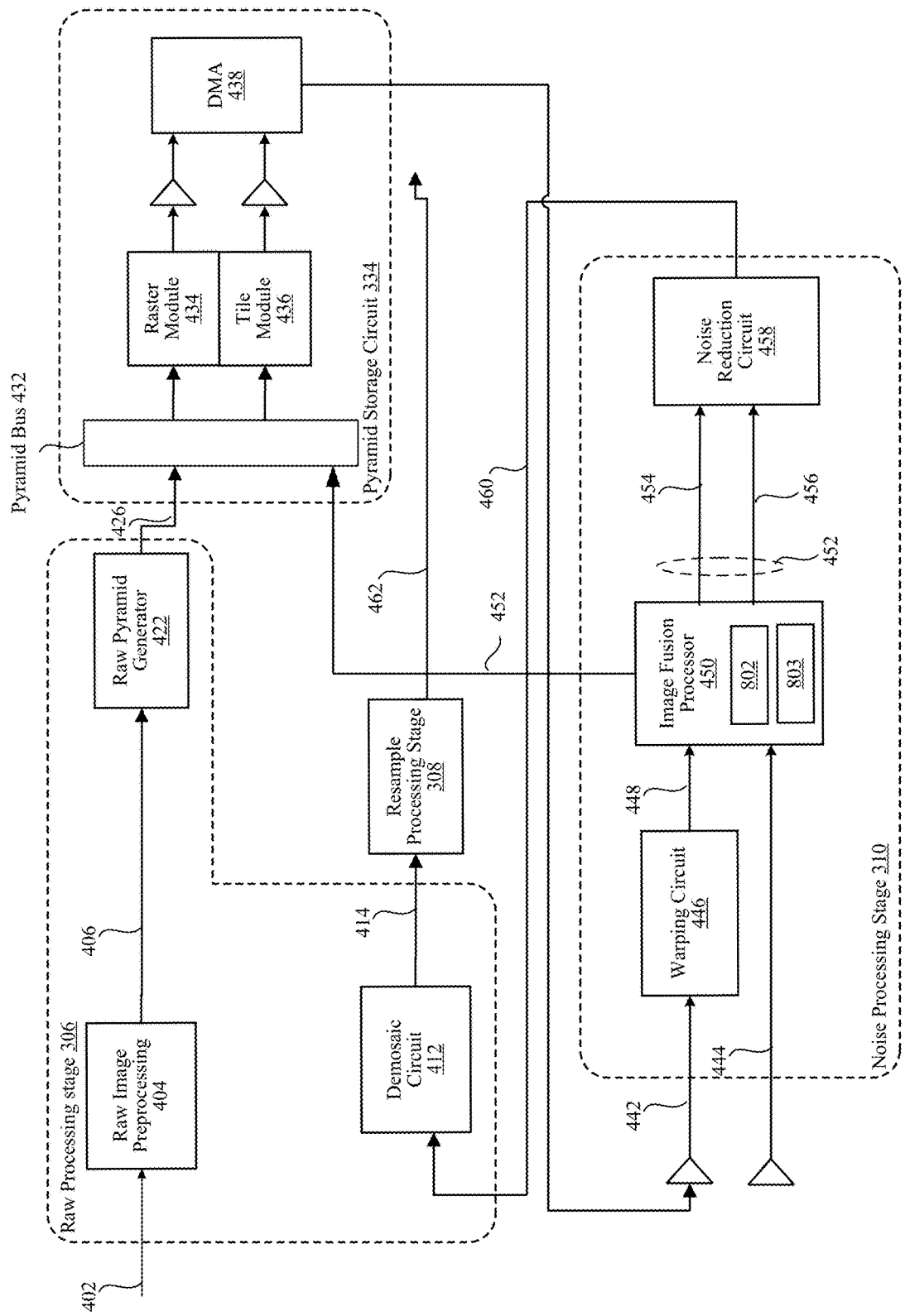
FIG. 5B illustrates a high level diagram of how the image fusion circuit operates in the second raw image mode, in accordance with some embodiments.

As shown in FIG. 4, the image fusion circuit 400 may include the raw processing stage 306, the resample processing state 308, and the noise processing stage 310. Each of these stages may be operated differently based on whether the image fusion circuit 400 is operating in the first processed image mode or second raw image mode. In some embodiments, a controller (e.g., central control 320 illustrated in FIG. 3, not shown in FIG. 4) is coupled to the image fusion circuit 400 and configures the components of the image fusion circuit 400 to perform different operations based on the desired mode or image fusion scheme. In some embodiments, the controller sets a control register based on whether the image fusion circuit 400 is to operate in the first processed image mode or the second raw image mode. The components of the image fusion circuit 400 (e.g., raw processing stage 306, resample processing stage 308, and noise processing stage 310) may access the control register to determine which mode to operate in, and, based on the value of the control register, perform different operations based on the selected mode. FIG. 5A illustrates a high level diagram of how the image fusion circuit 400 operates in the first processed image mode, in accordance with some embodiments, while FIG. 5B illustrates a high level diagram of how the image fusion circuit 400 operates in the second raw image mode, in accordance with some embodiments. Operations of the image fusion circuit 400 in each mode are described in relation to FIG. 4 and FIGS. 5A and 5B below.

The image fusion circuit 400 receives raw image data 402 captured by the image sensor system 201. In some embodiments, the raw image data 402 corresponds to a plurality of sequentially captured images, while in other embodiments, the raw image data 402 may correspond to sets of images captured concurrently using different image sensors 202 (e.g., first and second images captured at the same time using different sensors with different exposure times). The raw image data 402 may be received in a raw Bayer image format.

The raw image processing circuit 404 of the raw processing stage 306 receives the raw image data 402, and performs a series of Bayer preprocessing operations on the received raw image data. For example, as discussed above, operations performed by the raw image processing circuit 404 of the raw processing stage 306 may include, but are not limited to, raw noise filtering (RNF), lens shading correction (LSC), highlight recovery (HR), sensor linearization (SLIN), etc. In some embodiments, the raw image processing circuit 404 comprises a preprocessing pipeline in which the raw image data 402 undergoes a plurality of preprocessing operations in series. The raw image preprocessing circuit 404 outputs the image data generated from preprocessing the raw image data 402 as preprocessed raw image data 406. In some embodiments, different preprocessing operations may be performed based on whether the image fusion circuit 400 is running in processed image/YCC mode or raw image mode (e.g., in some embodiments, the preprocessing operations may include a raw noise filtering operation when the image fusion circuit 400 is in processed image mode to aid in demosaicing, while the raw noise filter may be bypassed when the image fusion circuit 400 is running in raw image mode).

The raw image processing circuit 404 of the raw processing stage 306 is coupled to a raw pyramid generator circuit 422 and demosaic circuit 412, and is configured to route the preprocessed raw image data 406 to either the raw pyramid generator circuit 422 or the demosaic circuit 412, based on whether the image fusion circuit 400 is operating in the first or second mode (e.g., using a MUX or other type of routing circuitry). For example, as illustrated in FIG. 5A, in the first processed image mode, the raw image preprocessing circuit 404 transmits the preprocessed raw image data to the demosaic circuit 412.

The demosaic circuit 412 is configured to receive raw image data (e.g., preprocessed raw image data 406), and demosaics the received raw image data to generate full-color image data 414 (e.g., RGB image data). For example, the demosaic circuit 412 may convert or interpolate missing color samples from received raw Bayer image data to output image data into a full-color domain. Demosaic operations may include low pass directional filtering on the interpolated samples to obtain full-color pixels. In some embodiments, the full-color image data 414 output by the demosaic circuit 412 is of the same resolution as the received Bayer image data.

The demosaic circuit 412 outputs the full-color image data 414 to the resample processing stage 308. As discussed above, the resample processing stage 308 may perform various operations to convert, resample, or scale image data received from raw processing stage 306. In some embodiments, the resample processing stage 308 converts the received image data 414 from an RGB format into YCbCr format for further processing. The resample processing stage 308 may further upscale or downscale the image data. For example, the resample processing stage 308 may downscale the image data by performing vertical resampling followed by horizontal resampling. In addition, the resample processing stage 308 may perform additional operations, such as removing color aliasing artifacts near luminance edges that may have been introduced by the demosaic circuit 412. In some embodiments, the resample processing stage 308 may also operate in a non-scaling mode, e.g., without downscaling the image data. In some embodiments, the resample processing stage 308 converts received image data to a YCC 4:4:4 color space when operating in non-scaling mode, and to a YCC 4:2:2 color space if performing upscaling or downscaling.

In the first processed image mode, the resampled image data 418 output by the resample processing stage 308 is received by the pyramid generator circuit 332, which generates an image pyramid 424 for each image frame of the image data. As discussed above, each generated pyramid comprises an unscaled single color version of the image (e.g., Y component only), and multiple full-color downscaled versions of the image obtained by sequentially downscaling the received image frame. The generated pyramid thus comprises low frequency components of the downscaled images and an unscaled single color version (e.g., luma component) of the received image.

The pyramid storage circuit 334 receives the image pyramids 424 output by the pyramid generator circuit 332, and stores the image pyramids in memory in preparation for warping and/or fusion. For example, in applications where two captured images are to be fused (e.g., concurrently captured long exposure image frame and short exposure image frame, or two sequentially captured images), the pyramid generator circuit 332 may generate a pyramid for the first of the two images, which is stored using the pyramid storage circuit 334 while an image pyramid for the second image is being generated.

The pyramid storage circuit 334 determines how the generated image pyramid 424 is to be stored, and may include, among other components, a pyramid bus 432, a raster module 434, tile module 436, and DMA 438. The pyramid bus 432 receives image pyramids (e.g., image pyramids 424 from the pyramid generator circuit 332, and/or raw image pyramids from the raw pyramid generator circuit 422, discussed in greater detail below) and sends the received pyramid to the raster module 434 or the tile module 436, based upon whether the image pyramid is to be warped as part of an image fusion process. For example, if a received image pyramid is to be warped as part of noise processing/image fusion, the pyramid bus 432 transmits the image pyramid to the tile module 436 to be converted into a tile format for storage. On the other hand, if the image pyramid does not need to be warped, the image pyramid is sent through the raster module 434. In some embodiments, the pyramid generator circuit 332 is configured to output the image pyramid 424 already in raster form. As such, the raster module 434 may simply be bypass circuit, allowing the image pyramid 424 to be stored to memory.

In some embodiments, the raster and/or tile modules 434 and 436 output the image pyramid to direct memory access (DMA) 438, which stores the image pyramid (in raster or tile format) within persistent memory (e.g., a DRAM) or within a cache that bypasses the memory. In some embodiments, if only a portion of the image pyramid is to be stored (e.g., the image pyramid is to be immediately used for image fusion, such that only a portion of the pyramid needs to be stored at a time), then the DMA 438 may store the image pyramid using the cache, which acts as a buffer between the pyramid generator circuit 332 and the noise processing stage 310. On the other hand, if the entire image pyramid is to be stored, and/or stored for a length of time, then the image pyramid is stored in the DRAM. In some embodiments, the DRAM is used to a store previously processed image pyramid (e.g., a history image pyramid) to be fused with image pyramids created from received image data 402.

The noise processing stage 310 performs temporal and spatial processing on image pyramids of received images (e.g., "temporal-then-spatial" processing). In some embodiments, the noise processing state 310 comprises an image fusion processor 450 and a noise reduction circuit 458. In some embodiments, the noise processing stage 310 is configured to receive, from the DMA 438, a first image pyramid 442 and a second image pyramid 444, and fuse the first and second image pyramids (e.g., at the image fusion processor 450) to generate a fused image pyramid 452. The fused image pyramid 452 is then processed by noise reduction circuit 458 to generate a denoised image 460. In some embodiments, the image fusion processor 450 and/or the noise reduction circuit 458 may be bypassed. For example, in some operating modes, the image fusion processor 450 may receive only the first image pyramid 442, and output the first image pyramid 442 as the fused image pyramid 452 to the noise reduction circuit 458.

In some embodiments, the first and second images pyramids 442 and 444 correspond to image pyramids 424 generated by the pyramid generator 332, using respectively, first and second images of the received images 402 that have been preprocessed, de-mosaiced, and resampled (e.g., resampled image data 418 generated from received images 402). In some embodiments, at least one of the first and second image pyramids 442 and 444 corresponds to a previously fused image pyramid (e.g., a previously fused image pyramid 452). How the first and second image pyramids 442 and 444 are received by the noise processing stage 310 may depend upon a current image fusion scheme (e.g., streaming, two-frame fusion, IIR, FIR, etc.) implemented by the image fusion circuit 400. In some embodiments, the noise processing stage 310 may be able to receive a generated pyramid 410 directly from the pyramid generator 332 (e.g., without going through the pyramid storage circuit 334).

In some embodiments, the noise processing stage 310 uses a warping circuit 446 to warp the first image pyramid 442 to be more spatially aligned with the second image pyramid 444 prior to fusing the first and second image pyramids, based upon one or more warping parameters. In some embodiments, the warping parameters correspond to parameters determined by an image registration processor (not shown) to align the images of the first image pyramid 442 with those of the second image pyramid 444 (which may be referred to as a primary or reference image pyramid). In some embodiments, the image registration processor is implemented as part of the vision module 322 illustrated in FIG. 3. The warping circuit 446 performs a linear or non-linear transformation defined by the model generated by the image registration processor to warp the first image pyramid 442 using the mapping information according to the warping parameters to generate a warped version of the first image pyramid 442 (e.g., warped image pyramid 448) spatially better aligned to the image of the second image pyramid 444 (e.g., a primary image or reference image). In some embodiments, the warping circuit 446 is a multi-scale warping circuit configured to warp each stage of the first image pyramid 442 to produce the warped image pyramid 448, comprising an unscaled warped single-color image and plurality of downscaled warped multi-color images.

The warped image pyramid 448 generated by warping circuit 446 is passed onto image fusion processor 450. Image fusion processor 450 performs per pixel blending between a portion of the images of the warped image pyramid 448 generated from the first image pyramid 442 with a portion of the images of the second image pyramid 444 to generate the fused image pyramid 452. The fused pyramid includes an unscaled single color image and one or more downscaled images having multiple color components, each downscaled image corresponding to a downscaled version of a previous stage of the fused image pyramid 452. In some embodiments, the fused image pyramid 452 (also referred to as a reconstructed pyramid) may be received by the pyramid storage circuit 334 to be stored in memory (e.g., a DRAM) for use in subsequent image fusion operations, based upon a current image fusion scheme implemented by the image fusion circuit 400. In addition, at least a portion of the fused image pyramid 452 is passed onto the noise reduction circuit 458 for further processing and enhancement (e.g., spatial processing). For example, in some embodiments, the unscaled single color version 454 and a first downscaled stage 456 (corresponding to a first downscaled level of the fused image pyramid 452, and has a pixel resolution equal to a quarter of a pixel resolution of unscaled single color version 454) of the fused image pyramid 452 are passed to the noise reduction circuit 458. The image fusion processing circuit 450 includes multi-scale image fusion circuit 802 to produce the downscaled images of the fused image pyramid 452 (including first downscaled version 456), shown in FIG. 6A, and image fusion circuit 603 to produce the unscaled single color version 454 of the fused image pyramid 452, shown in FIG. 6B.

Noise reduction circuit 458 is configured to receive at least a portion of the fused image pyramid (e.g., unscaled single-color version 454 and first downscaled version 456) and perform noise reduction (e.g., multi-band noise reduction (MBNR)) to obtain a denoised image 460. In some embodiments, the noise reduction circuit 458 is configured to, in processed image mode, generate a denoised unscaled single-color image (Y component only) and a denoised first downscaled version (having Cb and Cr components), allowing for construction of a full-resolution image with chroma sampled as 4:2:0. In some embodiments, the noise reduction circuit 458 further receives confidence values associated with each pixel of the unscaled single-color version 454 and first downscaled version 456, wherein an amount of noise reduction performed may be based upon the confidence values of the received images (e.g., a higher confidence value may indicate that less noise reduction is necessary). In some embodiments, each pixel is associated with a confidence value specified using a predetermined number of bits (e.g., 4 bits), where a confidence value of 0 indicates an invalid pixel, and may indicate a number of valid image pixels fused to produce the pixel. In some embodiments, the pyramid generator circuit 332 may mark overexposed pixels of received images as having a confidence value of 0, and propagate the confidence value to all stages of the generated pyramid.

Thus, as illustrated in FIG. 5A, the image fusion circuit, when operating in the first processed image mode, preprocesses and demosaics the received raw image data 402 (at the raw processing stage 306) to convert the raw image data 402 to color image data 414 (e.g., RGB image data), and resamples the image data at the resample processing stage 308 (which may further convert the image data to YCC image data) to generate resampled image data 418, which is used by the pyramid generator 332 to generate an image pyramid of the processed image data. The generated image pyramid 424 may then be processed at the noise processing stage 310 (e.g., following storage using the pyramid storage circuit 430), where it may undergo image fusion and/or noise reduction to generate a denoised image 460 as a final output image.

On the other hand, in the second raw image mode, the image fusion circuit 400, as illustrated in FIG. 5B, generates image pyramids using raw image data (e.g., raw Bayer image data) and performs noise processing operations on the generated pyramids, prior to de-mosaicing and resampling. Because image fusion and noise reduction processing are performed on the raw image data without resampling or downscaling the raw image data, the resulting fused images may be of high quality. However, as the raw image data is not downsampled prior to pyramid generation, the image pyramids and fused images will occupy a larger memory footprint, which may not be practical for certain applications.

As illustrated in FIG. 5B, when the image fusion circuit 400 is operating in the second raw image mode, the raw image preprocessing circuit 404 receives the raw image data 402 and performs preprocessing on the raw image data 402. However, instead of sending the preprocessed raw image data 406 to the demosaic circuit 412 and resample processing stage 308 for de-mosaicing and resampling, the preprocessed raw image data is received by a raw pyramid generator 422.

The raw pyramid generator 422 generates a raw image pyramid 426 from an image of the preprocessed raw image data 406. The raw image pyramid 426 generated by the raw pyramid generator 422 comprises a first unscaled image (scale 0 or stage 0) of raw image data (e.g., Bayer image data), and multiple full-color (e.g., RGB) downscaled versions of the image obtained by sequentially downscaling the received image frame (scales/stages 1 through n). The generated raw image pyramid 426 is stored using the pyramid storage circuit 334. For example, similar to the image pyramid 424 discussed above in relation to the first operating mode, the raw image pyramid 426 is received by the pyramid bus 432, which sends the raw image pyramid 426 to the raster module 434 or the tile module 436, based upon whether the image pyramid 426 is to be warped as part of an image fusion process, the results of which are transmitted by the DMA 438 to be stored in persistent storage or cached.

In some embodiments, scale 0 of the raw image pyramid 426 includes the raw image data following preprocessing by the raw image preprocessing circuit 404 (e.g., Bayer-sampled R, G, and B pixels output by the raw image preprocessing circuit 404 based on the received raw Bayer image data). In addition, the raw pyramid generator 422 may generate scale 1 of the raw image pyramid 426 (corresponding to the first downscaled version of the image) by applying a programmable decimation kernel to each pixel of the raw image data. In some embodiments, each pixel of the raw image data corresponds to a particular color component, red (R), blue (B), or green (Gr and Gb), and the decimation kernels include a red (R) decimation kernel, blue (B) decimation kernel, and green (G) decimation kernel, and are programmed such that, for a Gr pixel of the raw image data, a red value is calculated based upon red pixels of the raw image data within a specified neighborhood (e.g., 7 by 7 neighborhood) of the pixel, while a blue value is calculated based upon blue pixels of the neighborhood, and green values calculated based upon green pixels of the neighborhood. The resulting image is then downsampled (e.g., at the location of the Gr pixels in the raw image data) to generate a downscaled RGB image for scale 1 of the raw image pyramid that is downscaled relative to the unscaled image by a factor of 2 along each dimension. Subsequent downscaled scales of the raw image pyramid may be generated by further downscaling the scale 1 image.

Although FIGS. 4 and 5A-5B illustrate the raw pyramid generator 422 and the pyramid generator 332 as separate circuits, it is understood that in some embodiments, the raw pyramid generator 422 and the pyramid generator 332 may be implemented as part of the same circuit, which generates a processed image pyramid or a raw image pyramid from received image data based a current operating mode of the image fusion circuit 400, e.g., based upon a value of a control bit.

In the second raw image mode, the noise processing stage 310 receives stored raw image pyramids (e.g., from DMA 438) as the first and second image pyramids 442 and 448. Similar to the first processed image mode, the warping circuit 446 warps the first image pyramid 442 based upon one or more warping parameters to align the images of the first image pyramid 442 with those of the second image pyramid 444. The image fusion processor 450 performs per pixel blending between a portion of the images of the warped image pyramid 448 generated from the first image pyramid 442 with a portion of the images of the second image pyramid 444 to generate the fused image pyramid 452, where the multi-scale image fusion circuit 602 blends the downscaled images of the warped image pyramid 448 and second image pyramid to generate the downscaled images of the fused image pyramid 452 (including first downscaled version 456), while image fusion circuit 603 blends the unscaled raw images of the image pyramids to produce the unscaled raw image 454 of the fused image pyramid 452 (illustrated in greater detail in FIG. 7).

The fused pyramid includes an unscaled raw image and one or more downscaled images having multiple color components, each downscaled image corresponding to a downscaled version of a previous stage of the fused image pyramid 452. In some embodiments, the fused image pyramid 452 is received by the pyramid storage circuit 334 to be stored in memory (e.g., a DRAM) for use in subsequent image fusion operations, based upon a current image fusion scheme implemented by the image fusion circuit 400. In addition, at least a portion of the fused image pyramid 452 is passed onto the noise reduction circuit 458 for further processing and enhancement (e.g., the unscaled raw image 454 and a first downscaled stage 456 corresponding to a first downscaled level of the fused image pyramid 452 and having a pixel resolution equal to a quarter of a pixel resolution of unscaled single color version 454).

The image fusion processing circuit 450 comprises a control register configured to store a control parameter specifying an operating mode of the image fusion processing circuit 450 (e.g., indicating that the image fusion processing circuit 450 is operating in first processed image mode, or second raw image mode). In some embodiments, image fusion processing circuit 450 sets the control register based upon one or more configuration mode parameters received from a controller (e.g., central control 320). Based upon the control parameter, the image fusion processing circuit 450 processes the warped image pyramid 448 and the second image pyramid 444 differently, to implement the selected operating mode.

The noise reduction circuit 458 receives at least a portion of the fused image pyramid (e.g., unscaled raw image 452 and a first downscaled stage 454) and performs noise reduction on the received images to generate a denoised image 460 comprising raw image data. In some embodiments, the denoised image 460 corresponds to a denoised unscaled full resolution raw image (e.g., Bayer sampled full resolution image). Because the unscaled stage of the fuse image pyramid received by the noise reduction circuit 458 when operating in raw image mode comprises raw image data instead of single color data, the noise reduction circuit 458 will utilize different filter kernels for performing bilateral filtering on the raw image data in comparison to the single color image data when operating in the first processed image mode. For example, in some embodiments, the noise reduction circuit 458 utilizes different filter kernels corresponding to red, green, and blue pixels. In some embodiments, the noise reduction circuit 458 comprises a control register configured to store a control parameter specifying an operating mode of the noise reduction circuit 458 (e.g., indicating that the noise reduction circuit 458 is operating in first processed image mode, or second raw image mode). In some embodiments, noise reduction circuit 458 sets the control register based upon one or more configuration mode parameters received from a controller (e.g., central control 320), and processes the received image data in accordance with the set control register. Operations of the noise reduction circuit are discussed in greater detail below in relation to FIG. 9.

As illustrated in FIG. 5B, in raw image mode, the denoised image 460 generated by the noise reduction circuit 458 and comprising raw image data is transmitted to the demosaic circuit 412 and resample processing stage 308 to be demosaiced and resampled. For example, as discussed above, the demosaic circuit 412 may process the raw image data of the denoised image 460 to generate RGB image data, while the resample processing stage 308 may convert the RGB image data to YCC image data, and/or downsample the received image data. The resulting resampled image 462 may be output as an output image, to be used in subsequent applications.

As such, as illustrated in FIGS. 4 and 5A-5B, the image fusion circuit is able to operate in different modes to fuse processed image data or raw image data, based upon the requirements to specific applications. To do so, the image fusion circuit reconfigures how the image data is routed between different components, in order to demosaic and resample raw image data for generating a processed image pyramid usable for image fusion in the processed image mode, or to generate a raw image pyramid for image fusion, and only performing demosaicing and resampling afterwards, in raw image mode. In addition, certain components of the image fusion circuit, such as the image fusion processor 450 and the noise reduction circuit 458, may operate differently based on whether the image fusion circuit is operating in processed image mode or raw image mode (e.g., based on one or more received control parameters).

Example Architecture for Image Fusion Processing

As discussed above, components of the image fusion circuit may be configured to operate differently, based on which mode the image fusion circuit is operating in. For example, the image fusion processor 450 may perform different operations for fusing received image pyramids, based on whether the received image pyramids are processed image pyramids (e.g., generated by the pyramid generator 332) or raw image pyramids (e.g., generated by the raw pyramid generator 422). In some embodiments, the image fusion processor 450 comprises a control register configured to receive and store a control parameter indicating which mode the image fusion processor 450 is operating in. Operations performed by the image fusion processor to fuse different types of image pyramids in different modes are described in greater detail below.

As illustrated in FIG. 4, the image fusion processor 424 comprises a multi-scale image fusion circuit 602 and an image fusion circuit 603 for fusing the warped image pyramid 448 and the second image pyramid 444. The multi-scale image fusion circuit 602 is configured to fuse stages 1 through n of the received image pyramids (corresponding to downscaled full-color images), while the image fusion circuit 603 fuses scale 0 of the image pyramids (corresponding to unsealed single-color image of processed image pyramids, or unsealed raw images of raw image pyramids).

Figure 6A:
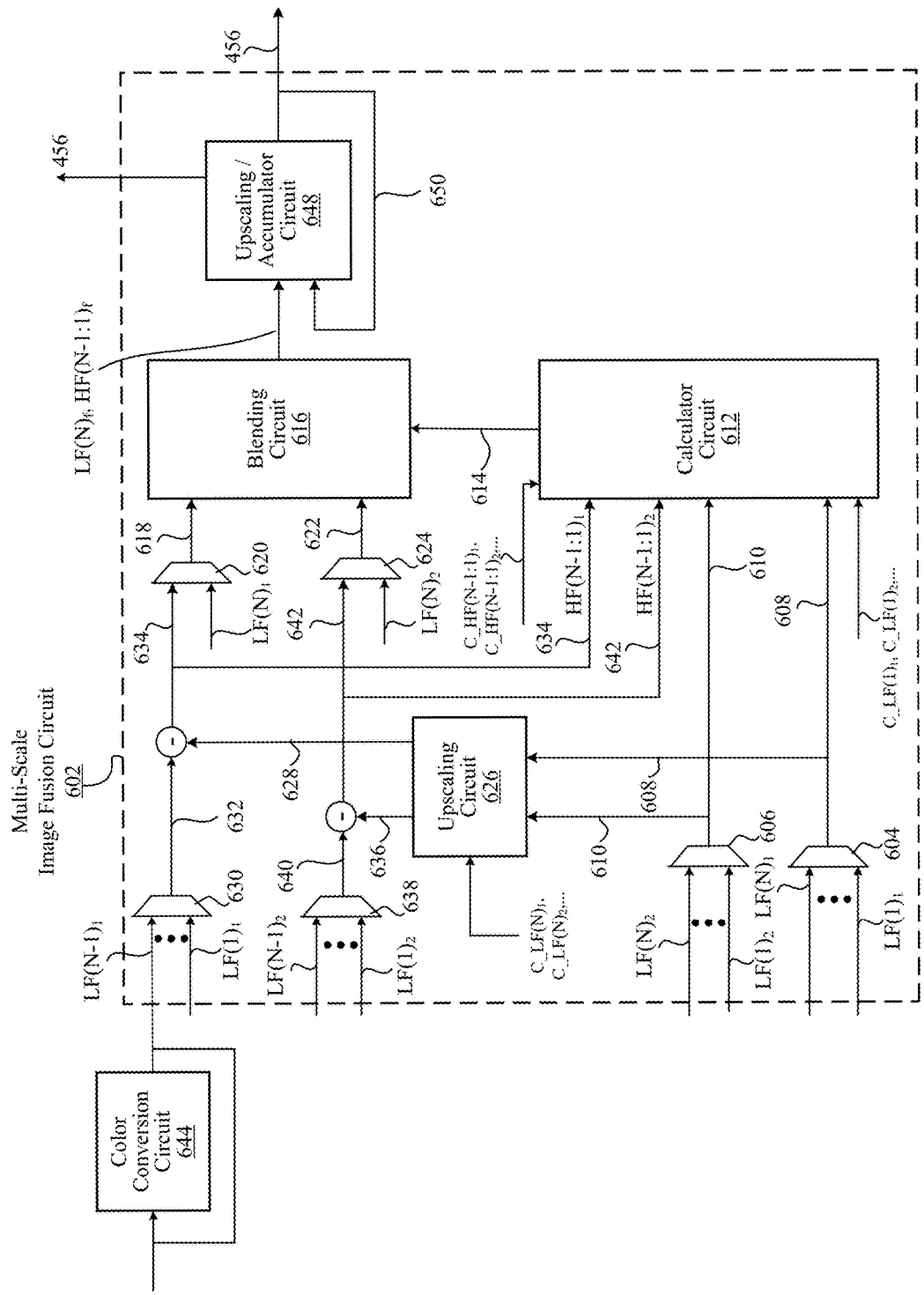
FIG. 6A is a detailed block diagram of multi-scale image fusion circuit as part of image fusion processing circuit, according to one embodiment.

FIG. 6A is a detailed block diagram of multi-scale image fusion circuit 602 as part of image fusion processing circuit 450, according to one embodiment. Multi-scale image fusion circuit 602 performs per pixel blending between each downscaled multi-color stage of warped image pyramid 448 with a corresponding downscaled multi-color stage of the second image pyramid 444 to generate downscaled multi-color stages of a fused image pyramid 452. For example, the multi-scale image fusion circuit 602 generates first downscaled stage of fused image pyramid 452 (e.g., first downscaled stage 456) by upscaling and accumulating the multiple downscaled stages of the fused image pyramid. The first downscaled stage of fused image pyramid 452 includes multiple color components and has a pixel resolution lower than a pixel resolution of unsealed stage of fused image pyramid 454 (unsealed single-color image in processed image mode, or unsealed raw image in raw image mode).

In some embodiments, the multi-scale image fusion circuit 602 is configured to blend pixels of the downscaled multi-color stages of the image pyramids in YCC color space. However, in the second raw image mode, the downscaled multi-color stages of the raw image pyramids may be in the RGB color space. Therefore, when operating in the second raw image mode, the image data of the downscaled multi-color stages of the received raw image pyramids are processed at a color conversion circuit 644 that converts the RGB image pyramid data into YCC image data prior to being received by the remaining components of the multi-scale image fusion circuit 602. On the other hand, in the first processed image mode, the downscaled stages of the processed image pyramids may already be in the YCC color space. As such, the color conversion circuit 644 is bypassed when the multi-scale image fusion circuit 602 operates in processed image mode. In addition, in raw image mode, the downscaled multi-colors stages of raw image pyramids that have been previously fused (e.g., a history image pyramid) may also be in the YCC color space. As such, the color conversion circuit 844 may also be bypassed in raw image mode for the first or second image pyramids Multi-scale image fusion circuit 602 receives low frequency components of the downscaled multi-color warped images $LF(1)_1, LF(2)_1, \ldots, LF(N)_1$ as part of warped image pyramid 448 (obtained by warping each stage of the first image pyramid 442), where N represents levels of downsampling performed on the stage of the warped image pyramid 448, e.g., for an image pyramid having seven stages 0 through 6, scale 0 would correspond to the unsealed single-color image of the pyramid, and N=6 represents 6 levels of downscaling. Multi-scale image fusion circuit 602 further receives low frequency components of the downscaled multi-color images $LF(1)_2, LF(2)_2, \ldots, LF(N)_2$ as part of the second image pyramid 444. The downscaled warped image with the lowest level of resolution $LF(N)_1$ is first passed via multiplexer 604 onto calculator circuit 612 as downscaled warped image data 608. The downscaled image with the lowest level of resolution $LF(N)_2$ is also passed via multiplexer 606 onto calculator circuit 612 as downscaled image data 610. The calculator circuit 612 further receives confidence values associated with the pixels of the received downscaled images ($LF(N)_1$ and $LF(N)_2$).

Calculator circuit 612 determines a patch distance for a pixel by processing photometric distances between pixels in a patch of downscaled warped image data 608 and corresponding pixels in a patch of downscaled image data 610. The patch of downscaled warped image data 608 includes the pixel as a central pixel and other pixels within defined spatial distance from the pixel. A patch distance represents a measure of similarity between two patches. In some embodiments, the patch distance between two patches is determined based upon distances between respective pixels of the two patches (e.g., a sum of Euclidian distances between corresponding pixels in both patches). In some embodiments, the calculator circuit 612 determines patch distances using different patch sizes based upon a scale of the image pyramids being processed.

Calculator circuit 612 also determines a cross-correlation value (e.g., normalized cross-correlation, or NCC) for the pixel by determining a cross variance between pixel values of the patch of downscaled warped image data 608 and pixel values of the patch of downscaled image data 610. The NCC is used as a secondary measure of patch similarity.

Calculator circuit 612 determines blend parameters 614 for the pixel as a function of one or more similarity measures, e.g., the patch distance PD and the NCC. If the patches are more similar, a higher level of blending is performed to avoid ghosting, and vice versa. In some embodiments, the calculator circuit determines a similarity score S based upon the determined patch distance PD and normalized cross correlation NCC of the patches, where S is a value between 0 and 1 (0 indicating that the patches are completely dissimilar, and 1 indicating that the patches are identical).

In some embodiments, the blend parameters 614 are further based upon received confidence values corresponding to the pixels of the patch of downscaled warped image data 608 and corresponding pixels of the patch of downscaled image data 610. For example, the calculator circuit 612 may determine blend parameters 614 for a pixel as a normalized combination of a weight W1 for the pixel of a first image and a weight W2 for a pixel of a second image, where the weights W1 and W2 are based on desired pre-programmed values and adjusted based upon the confidence value and similarity scores of the respective pixels, to generate the actual per pixel weight values w1 and w2 to be used for blending that takes into account confidence and similarity. For example, the blend parameters may be determined such that if the patches are completely dissimilar (e.g., S=0), then only the pixel from the reference image is used (e.g., where the second image is the reference image, setting W1 to 0). On the other hand, if the patched are completely similar (e.g., S=1), then fusion may be performed without modifying the weights W1 and W2.

The generated blend parameters 614 for the pixel are passed onto blending circuit 616. Blending circuit 616 blends pixel value 618 of the pixel of the downscaled warped image $LF(N)_1$ (passed via multiplexer 620) with pixel value 622 of a corresponding pixel of the downscaled image $LF(N)_2$ (passed via multiplexer 624) using blend parameters 614 for the pixel as determined by the calculator circuit 612, to generate a blended pixel value for a pixel of a downscaled fused image with the lowest level of resolution $LF(N)_f$. Blending circuit 616 blends a pair of pixel values $x_1(i,j)$ and $x_2(i,j)$ in two different images (e.g., images $LF(N)_1$, $LF(N)_2$) corresponding to the same spatial coordinate $(i,j)$ in both images using blend parameters 614 to a obtain a blended pixel value $b(i,j)$.

The downscaled warped image $LF(N)_1$ and downscaled image $LF(N)_2$ are also passed (via multiplexers 604 and 606) as downscaled warped image data 608 and downscaled image data 610 onto upscaling circuit 626. Upscaling circuit 626 upscales downscaled warped image data 608 two times in both horizontal and vertical dimensions to generate upscaled warped image data 628 (scale N−1). In addition, the upscaling circuit 626 further receives the confidence values corresponding to the pixels of the patch of downscaled warped image data 608, and upscales the confidence values along with the pixels of the downscaled image, such that each pixel of the upscaled image is associated with an upscaled confidence value.

Multiplexer 630 passes downscaled warped image $LF(N−1)_1$ as downscaled warped image data 632. Pixel values of upscaled warped image data 628 are subtracted from corresponding pixel values of downscaled warped image data 632 (scales N−1) to generate warped image data 634 representing a high frequency component of downscaled warped image $HF(N−1)_1$ passed onto calculator circuit 612 and onto blending circuit 616 (via multiplexer 620) as pixel values 618.

Similarly, upscaling circuit 626 also upscales downscaled image data 610 to generate upscaled image data 636 (scale N−1), as well as corresponding upscaled confidence values for the upscaled image data 636. Multiplexer 638 passes downscaled image $LF(N−1)_2$ as downscaled image data 640, from which pixel values of upscaled image data 636 are subtracted to generate image data 642 representing a high frequency component of downscaled image $HF(N−1)_2$ passed onto calculator circuit 612 and onto blending circuit 616 (via multiplexer 624) as pixel values 622.

Calculator circuit 612 determines a patch distance for a pixel of warped image data 634 by processing photometric distances between pixels in a patch of warped image data 634 (e.g., the high frequency component of downscaled warped image $HF(N−1)_1$) and corresponding pixels in a patch of image data 642 (e.g., the high frequency component of downscaled image $HF(N−1)_2$). The downscaled warped image $LF(N−1)_1$ is further passed via multiplexer 604 onto calculator circuit 612 as downscaled warped image data 608. The downscaled image $LF(N−1)_2$ is also passed via multiplexer 606 onto calculator circuit 612 as downscaled image data 610. Calculator circuit 612 determines a cross-correlation value (e.g., NCC) for the pixel by determining a cross variance between pixel values of a patch of downscaled warped image data 608 (e.g., the low frequency component of the downscaled warped image $LF(N−1)_1$) and pixel values of the patch of downscaled image data 610 (e.g., the low frequency component of the downscaled image $LF(N−1)_2$).

Calculator circuit 612 determines blend parameters 614 for the pixel as a function of the patch distance, NCC, and the weight values associated with the pixels of the received images, for high frequency components of the downscaled images $HF(N−1)_1$ and $HF(N−1)_2$, which are passed onto blending circuit 616. Blending circuit 616 blends pixel value 618 of the pixel of the high frequency component of downscaled warped image $HF(N−1)_1$ with pixel value 622 of a corresponding pixel of the high frequency component of downscaled image $HF(N−1)_2$ using the blend parameter 614 for the pixel to generate a blended pixel value for a pixel of a high frequency component of downscaled fused image $HF(N−1)_f$. This process of determining blending parameters 614, upscaling by upscaling circuit 626 and per-pixel blending by blending circuit 616 is recursively repeated until a high frequency component of a first downscaled version of fused image $HF(1)_f$ is generated.

As such, the blending circuit 616 generates blended pixel values of a downscaled fused image with the lowest level of resolution $LF(N)_f$ and blended pixel values of high frequency components of downscaled fused images of remaining levels of resolution $HF(N−1)_f$ through $HF(1)_f$. The upscaling/accumulator circuit 648 performs the process of image restoration to generate first downscaled version 456 of the fused image using fused downscaled versions $LF(N)_f$, $HF(N−1)_f$, $HF(N−2)_f$, ..., $HF(1)_f$.

Figure 8:
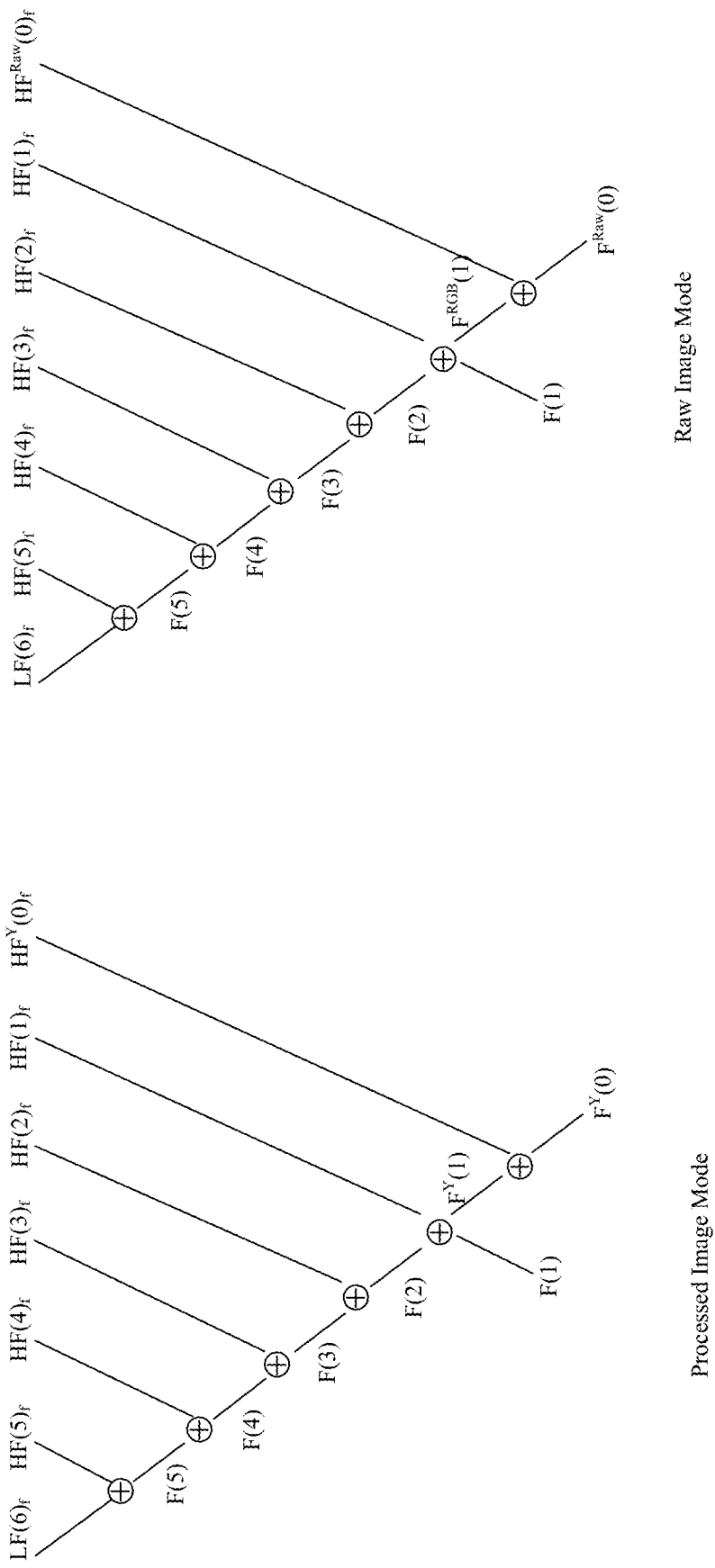
FIG. 8 is a conceptual diagram illustrating recursively upscaling and accumulating downscaled images as part of image fusion processing, according to one embodiment.

FIG. 8 is a conceptual diagram illustrating recursively upscaling and accumulating downscaled images as part of image fusion processing, according to one embodiment. While the fused image for the lowest downscaled level (e.g., level 6) of the fused image pyramid may be obtained by fusing the corresponding images of the two image pyramids to be used, fused upper level images of the fused image pyramid may be obtained by fusing the high frequency image data and then combining the fused high frequency component of level N with the fused pyramid scale N+1 from the previous fusion step, as illustrated in FIG. 8. The blending circuit 616 generates fused downscaled versions $LF(6)_f$, $HF(5)_f$, $HF(4)_f$, ..., $HF(1)_f$, which are passed onto upscaling/accumulator circuit 648. Upscaling/accumulator circuit 648 upscales fused downscaled version $LF(6)_f$ two times in both horizontal and vertical dimensions and sums its upscaled version with fused downscaled version $HF(5)_f$ to generate downscaled fused image 850, e.g., F(5). Upscaling/accumulator circuit 648 upscales downscaled fused image 850 (e.g., F(5)) two times in both horizontal and vertical dimensions and sums its upscaled version with fused downscaled version $HF(4)_f$ to generate a new downscaled fused image 850, e.g., F(4). This process is repeated until upscaling/accumulator circuit 648 generates first downscaled version of fused image 456, e.g., fused image F(1). In addition, the upscaling/accumulator circuit 648 may upscale and accumulate confidence values for each of the fused downscaled low-frequency and high-frequency images to determine confidence values for the downscaled fused images.

The resulting images F(1) and $F^Y(0)$ (in processed image mode) or $F^{Raw}(0)$ (in raw image mode) correspond to the first downscaled image 456 and the unscaled image 454 (single color image in processed image mode, or raw image in raw image mode) of the fused image pyramid 452 sent to the noise reduction circuit 458. In addition, these images, as well as the various downscaled fused images (e.g., F(5), F(4), ... ), may also be transmitted to the pyramid storage circuit 334 as the fused pyramid 452 to be stored for subsequent fusion operations.

As discussed above, the multi-scale image fusion circuit 602 is able to blend the downscaled images of either processed image pyramids (in processed image mode) or raw image pyramids (in raw image mode). In processed image mode, the multi-scale image fusion circuit 602 receives downscaled images in the YCC color space, and performs the blending functions discussed above in the YCC color space. On the other hand, when in raw image mode, the multi-scale image fusion circuit 602 converts the downscaled images of the raw image pyramids from an RGB color space to a YCC color space (e.g., using color conversion circuit 644), allowing the multi-scale image fusion circuit 602 to then perform the blending functions in the YCC color space in the same manner is in processed image mode.

In some embodiments, while downscaled images of raw image pyramids in raw image mode are initially received in the RGB color space, the multi-scale image fusion circuit 602 outputs fused images (e.g., F(1), F(2), etc.) in the YCC color space. In applications where the fused raw image pyramid 452 is transmitted to the pyramid storage circuit 334 to be stored for subsequent fusion, the downscaled images of the fused raw image pyramid 452 may comprise images in the YCC color space instead of an RGB color space. The multi-scale image fusion circuit 602 may thus, when performing fusion involving a previously fused raw image pyramid, bypass the color conversion circuit 644 when receiving downscaled image data of the previously fused raw image pyramid.

Figure 6B:
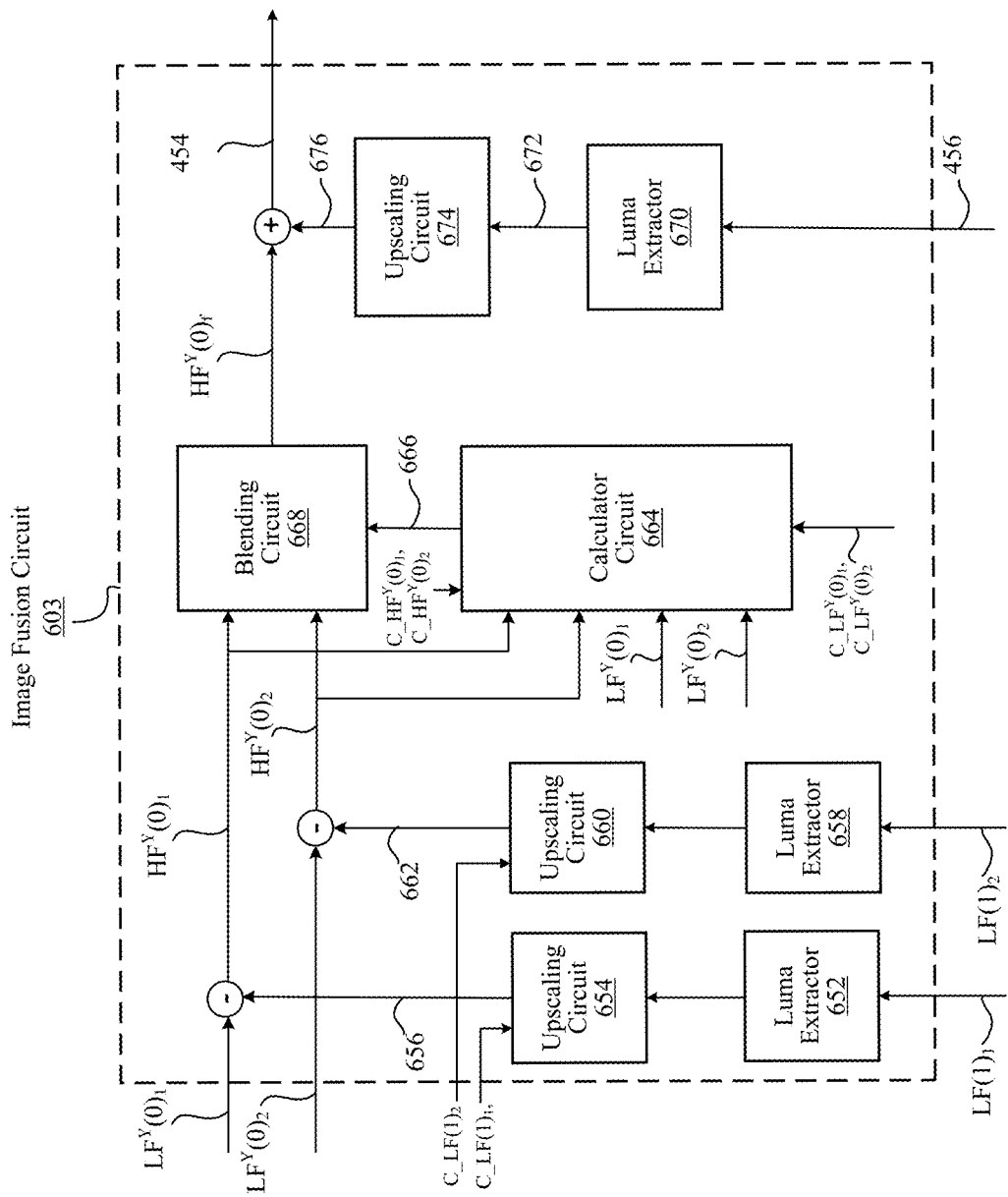
FIG. 6B is a detailed block diagram of image fusion circuit as part of image fusion processor operating in the first processed image mode, according to one embodiment.

FIG. 6B is a detailed block diagram of image fusion circuit 603 as part of image fusion processor 450 operating in the first processed image mode, according to one embodiment. In the first processed image mode, image fusion circuit 603 performs per pixel blending between unscaled single color images (e.g., luma component) of the warped image pyramid 448 and the second image pyramid 444 to generate unscaled single color fused image 454. Image fusion circuit 603 receives, as part of warped image pyramid 448 and the second image pyramid 444, unscaled single color version $LF^Y(0)_1$ and unscaled single color version $LF^Y(0)_2$, respectively. Image fusion circuit 603 further receives, downscaled warped image $LF(1)_1$ of warped image pyramid 448 and downscaled image $LF(1)_2$ of the second image pyramid 444 (e.g., from the multi-scale image fusion circuit 602).

Luma extractor circuits 652 and 658 extract a single color component (luma component) from downscaled images $LF(1)_1$ and $LF(1)_2$, respectively, to generate single color version of the downscaled images passed onto upscaling circuits 654 and 660. Upscaling circuits 654 and 660 upscale the single color version of the downscaled images twice in both spatial dimensions to generate single color version of upscaled images 656 and 662. In addition, the upscaling circuits 654 and 660 receive and upscale confidence values associated with the downscaled images $LF(1)_1$ and $LF(1)_2$ to generate upscaled confidence value for each upscaled image. Pixel values of single color version of upscaled images 656 and 662 are subtracted from corresponding pixel values of unscaled single color images $LF^Y(0)_1$ and $LF^Y(0)_2$, respectively, to generate a high frequency component of the unscaled single color images $HF^Y(0)_1$ and $HF^Y(0)_2$ passed onto calculator circuit 664 and blending circuit 668. In addition, the confidence values of $HF^Y(0)_1$ and $HF^Y(0)_2$ may be determined based on a minimum of the confidence values for $LF^Y(0)_1$ and the upscaled $LF(1)_1$, and a minimum of the confidence values for $LF^Y(0)_2$ and the upscaled $LF(1)_2$, respectively. The unscaled single color images $LF^Y(0)_1$ and $LF^Y(0)_2$, and their respective confidence values, are also passed onto calculator circuit 864.

Calculator circuit 664 determines a patch distance for a pixel by processing photometric distances between pixels in a patch of the high frequency component of unscaled single color version of warped image $HF^Y(0)_1$ and corresponding pixels in a patch of the high frequency component of unscaled single color version $HF^Y(0)_2$, in the same manner as calculator circuit 612 of multi-scale image fusion circuit 602 except that calculator circuit 664 processes single color images whereas calculator circuit 612 processes multi-color images. Calculator circuit 664 also determines a cross-correlation value (NCC) for the pixel by determining a cross variance between pixel values of a patch of unscaled single color version $LF^Y(0)_1$ and corresponding pixel values of a patch of unscaled single color version $LF^Y(0)_2$. Calculator circuit 664 determines blend parameter 666 for the pixel based on similarity metrics (e.g., the patch distance and the cross-correlation value) and confidence values associated with the received image data ($HF^Y(0)_1$ and $HF^Y(0)_2$) that are passed onto blending circuit 668. Blending circuit 668 blends a pixel value of the pixel of the high frequency component of unscaled single color version of warped image $HF^Y(0)_1$ with a pixel value of a corresponding pixel of the high frequency component of unscaled single color version $HF^Y(0)_2$ using blend parameter 666 for the pixel to generate a blended pixel value for a pixel of a high frequency component of unscaled single color version of fused image $HF^Y(0)_f$. Blending circuit 668 operates in the same manner as blending circuit 616 of multi-scale image fusion circuit 602 except that blending circuit 568 performs per pixel blending of single color images whereas blending circuit 616 performs per pixel blending of multi-color images.

Image fusion circuit 603 also receives first downscaled version of fused image 456 generated by multi-scale image fusion circuit 602. Luma extractor circuit 870 extracts a single color component (luma component) from first downscaled version of fused image 456 to generate single color version of first downscaled version of fused image 672 passed onto upscaling circuit 674, which upscales the single color version of first downscaled version of fused image 672 twice in both spatial dimensions (horizontal and vertical dimensions) to generate a single color version of upscaled fused image 676. Pixel values of single color version of upscaled fused image 676 are summed with corresponding pixel values of the high frequency component of unscaled single color version of fused image $HF^Y(0)_f$ to generate unscaled single color version of fused image 454.

As further shown in FIG. 8, a single color component (e.g., luma component) is extracted (via luma extractor circuit 670) from the first downscaled multi-color version of fused image F(1) to generate a first downscaled single color version of fused image $F^Y(1)$. The first downscaled single color version of fused image is upscaled (via upscaling circuit 674) and summed to the high frequency component of unscaled single color version of fused image $HF^Y(0)_f$ to generate an unscaled single color version of fused image $F^Y(0)$, e.g., unscaled single color version 454. The resulting fused images $F^Y(0)$, F(1), F(2), ... F(5) collectively form the fused image pyramid 452.

Figure 7:
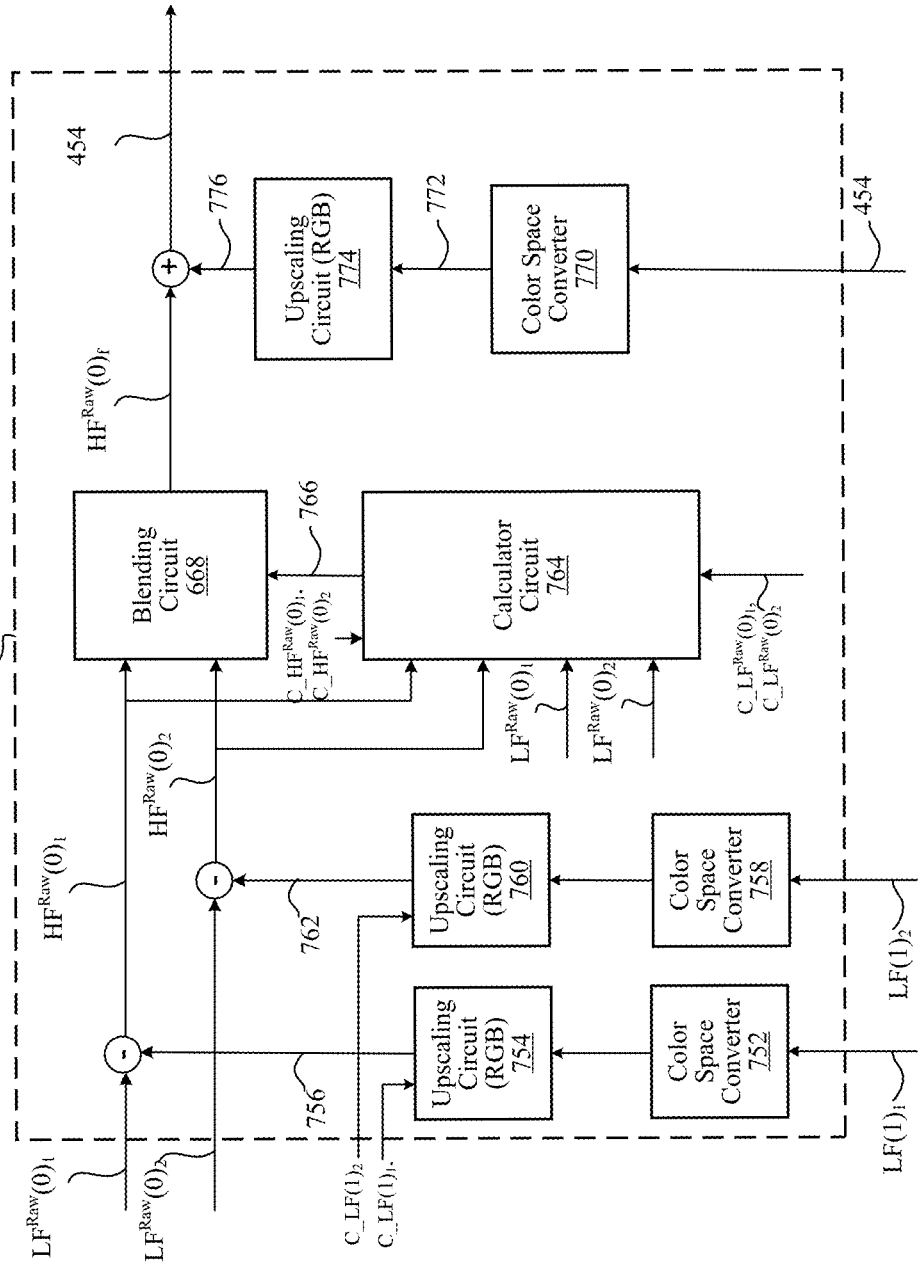
FIG. 7 illustrates a detailed block diagram of image fusion circuit as part of image fusion processor operating in the second raw image mode, according to one embodiment.

When operating in raw image mode, the image fusion circuit 603 processes received image data differently, due to the top scale of the raw image pyramids comprising raw image data instead of single color image data. FIG. 7 illustrates a detailed block diagram of image fusion circuit 603 as part of image fusion processor 450 operating in the second raw image mode, according to one embodiment. Similar to processed image mode, the image fusion circuit 603 in raw image mode determines high frequency components of the unscaled raw images of the raw image pyramids (i.e., $HF^{Raw}(0)_1$ and $HF^{Raw}(0)_2$) based on a difference between the unscaled raw images (i.e., $LF^{Raw}(0)_1$ and $LF^{Raw}(0)_2$) and respective upscaled versions of the first downscaled levels of the raw image pyramids (i.e., upscaled versions of $LF(1)_1$ and $LF(1)_2$). However, the pixels of the unscaled raw image of the raw image pyramids comprise color channel data (R, G, or B), in contrast to the unscaled image of the processed image pyramid, which comprise luminance (Y) data. On the other hand, as discussed above, the multi-scale image fusion circuit 602 processes the downscaled levels of the raw image pyramids by converting the RGB image data of the downscaled levels into YCC color space data. As such, the image fusion circuit 603 may receive the image data for the first downscaled levels of the raw image pyramids $LF(1)_1$ and $LF(1)_2$ in YCC color space.

Instead of extracting luminance components from the received image data (using luminance extractors 652/658 as done in processed image mode shown in FIG. 6B), the image data of the images is processed at respective color space converters 748 and 756 that convert the YCC image data into RGB image data. In addition, the converted RGB image data is upscaled by upscaling circuits 752 and 760, which upscale the image data in RGB space (in contrast with upscaling circuits 654 and 660 illustrated in FIG. 6B, which upscale single-component image data, e.g., luminance component only). In some embodiments, if RGB image data for the first downscaled levels for a raw image pyramid being fused is available (e.g., if the raw image pyramid has not been previously fused, RGB data for the downscaled levels is available prior to being processed by the color conversion circuit 844), the color space converters 948 and 956 may be bypassed, and the first downscaled level RGB image data is provided directly to the upscaling circuits 952 and 960.

The resulting upscaled RGB image data 754 and 762 is subtracted from the unscaled raw image data $LF^{Raw}(0)_1$ and $LF^{Raw}(0)_2$, respectively, (e.g., by subtracting the color component for each pixel of the upscaled RGB data from the color component of the raw image data), to generate the high frequency components of the unscaled raw images of the raw image pyramids $HF^{Raw}(0)_1$ and $HF^{Raw}(0)_2$. The determined high frequency components are received by the blending circuit 668 and calculator circuit 764.

The calculator circuit 764 determines a patch distance for a pixel by processing photometric distances between pixels in a patch of the high frequency component of unscaled single color version of warped image $HF^{Raw}(0)_1$ and corresponding pixels in a patch of the high frequency component of unscaled single color version $HF^{Raw}(0)_2$, similar to operations of the calculator circuit 664 illustrated in FIG. 6B used during processed image mode. However, because the calculator circuit 764 receives raw image data where different pixels correspond to different color channels (instead of single-component image data), the calculator circuit 764, when determining patch distance, instead of determining distances between each pixel of the respective patches, determines a respective distance between pixels of respective color channels of the raw image data, e.g., a first distance between red pixels of the respective patches, a second distance between green pixels, and a third distance between blue pixels. The three values (corresponding to R, G, and B) are aggregated (e.g., using root sum of squares) to generate an aggregate patch distance value.

In addition, calculator circuit 764 also determines a cross-correlation value (NCC) for the pixel by determining a cross variance between pixel values of a patch of unscaled raw image $LF^{Raw}(0)_1$ and corresponding pixel values of a patch of unscaled raw image $LF^{Raw}(0)_2$. In some embodiments, the cross-correlation value is determined based on aggregated patch distances (e.g., aggregated R, G, and B patch distances), and is determined in the same way as in processed image mode. The calculator circuit 764 determines blend parameters 766 for the pixel based on similarity metrics (e.g., the patch distance and the cross-correlation value) and confidence values associated with the received image data that are passed onto blending circuit 668. Blending circuit 668 blends a pixel value of the pixel of the high frequency component of unscaled single color version of warped image $HF^{Raw}(0)_1$ with a pixel value of a corresponding pixel of the high frequency component of unscaled single color version $HF^{Raw}(0)_2$ using blend parameter 766 for the pixel to generate a blended pixel value for a pixel of a high frequency component of unscaled single color version of fused image $HF^{Raw}(0)_F$ in the same manner as in raw image mode as in processed image mode, except that the per pixel blending is performed on raw image data instead single-component image data.

In some embodiments, components of the image fusion circuit 603 illustrated in FIG. 7 (e.g., color space converters 748/756, RGB upscaling circuits 754/760, calculator circuit 764) may be implemented different components as their counterparts in FIG. 6B (e.g., luma extractors 652/658, single-component upscaling circuits 654/660, calculator circuit 664). For example, the image fusion circuit 603 may comprise luma extractors 652/658 and color space converters 752/758 implemented as separate, parallel components, wherein image data is routed to the luma extractors or the color space converters based on the operating mode of the image fusion circuit 603. However, in other embodiments, some of these components may be implemented as part of a single circuit configured to operate in different modes, e.g., an upscaling circuit that upscales a single component in a first mode and RGB components in a second mode, a calculator circuit configured to calculate patch distances differently based on the operating mode of the image fusion circuit, etc. In some embodiments, the image fusion circuit 603 configures the operation of each component, or routing between components, based upon a stored control parameter indicating the operating mode of the image fusion circuit.

In some embodiments, in either the first processed image mode or the second raw image mode, the image fusion processor 450 outputs only the unscaled top level image 454 (e.g., single color image $F^Y(0)$ in processed image mode, or raw image $F^{Raw}(0)$ in raw image mode) and the processed first downscaled image 456 (F(1)) of the fused image pyramid 452 to the noise reduction circuit 458 for noise reduction and additional processing (e.g., output as a fused output image in processed image mode, or subsequently demosaiced and resampled in raw image mode). On the other hand, the fused images F(5), F(4), . . . , F(1) and $F^Y(0)$ or $F^{Raw}(0)$ generated by the upscaling/accumulator circuit 648 may be assembled to form the fused image pyramid 452, which may be provided to the pyramid storage circuit 334 to be stored in memory. This allows for the fused image pyramid 452 to function as a history pyramid that may be later provided to the noise processing stage 310 as the first image pyramid 442 or the second image pyramid 444 to be fused with additional images (e.g., image pyramid 418 or raw image pyramid 426 generated based on received images 402). In some embodiments, the image fusion processor 450 may output the entire fused image pyramid 452 to the noise reduction circuit 458.

Example Architecture for Noise Reduction Circuit

The noise reduction circuit 458 processes fused image pyramid data output by the image fusion processor 450 to generate a denoised image 460 (corresponding to an output image in processed image mode, or an image to be subsequently demosaiced and resampled in raw image mode). The noise reduction circuit 458 performs noise reduction (e.g., bilateral filtering) on a received image pyramid comprising multiple scales of the input image where the lowest scale (e.g., scale 0) is an un-scaled version of the input image and each subsequent scale (e.g., scales 1, 2, . . . , N) is a downscaled version of the previous scale (e.g., by a factor of two in both horizontal and vertical dimensions). In processed image mode, the un-scaled version (scale 0) can include a single color component (e.g., luma component). On the other hand, in raw image mode, the un-scaled version comprises raw image data (e.g., Bayer image data, with pixels corresponding to red, green, or blue color channels). The downscaled versions of the input image include multiple color components (e.g., YCC image data). In some embodiments, the noise reduction circuit 458 receives only a portion of the fused image pyramid 452, e.g., the unscaled top-level image of the image pyramid 454 and the first downscaled level 456, and their respective confidence values.

In some embodiments, the noise reduction circuit 458 comprises a multi-scale multiple band noise reduction (MS-MBNR) circuit and a multiple band noise reduction (MBNR) circuit. The MS-MBNR circuit is configured to perform noise reduction on downscaled levels of an image pyramid (e.g., downscaled levels of the fused image pyramid 452 generated by the image fusion processor 450), while the MBNR performs noise reduction on the unscaled level (scale 0) of the image pyramid. In some embodiments, the MBNR receives image data corresponding to scale 1 and high frequency components of scale 0 of the image pyramid from the MS-MBNR circuit to reconstruct the scale 0 image of the image pyramid and generate a denoised scale 0 image.

In some embodiments, the MS-MBNR circuit and MBNR circuit each perform bilateral filtering on received image data corresponding to different levels of the fused image pyramid 452. Because the image data of downscaled levels of the fused image pyramid may be in the same format (e.g., YCC color space) in either processed image mode or raw image mode, the MS-MBNR circuit may perform the same operations in processed image mode as raw image mode. On the other hand, the MBNR circuit is configured to perform bilateral filtering on different types of image data, based on the operating mode of the image fusion circuit, due to the unscaled level (scale 0) of the image pyramid comprising single-component image data (e.g., Y component only) in processed image mode, or raw image data in raw image mode.

Figure 9:
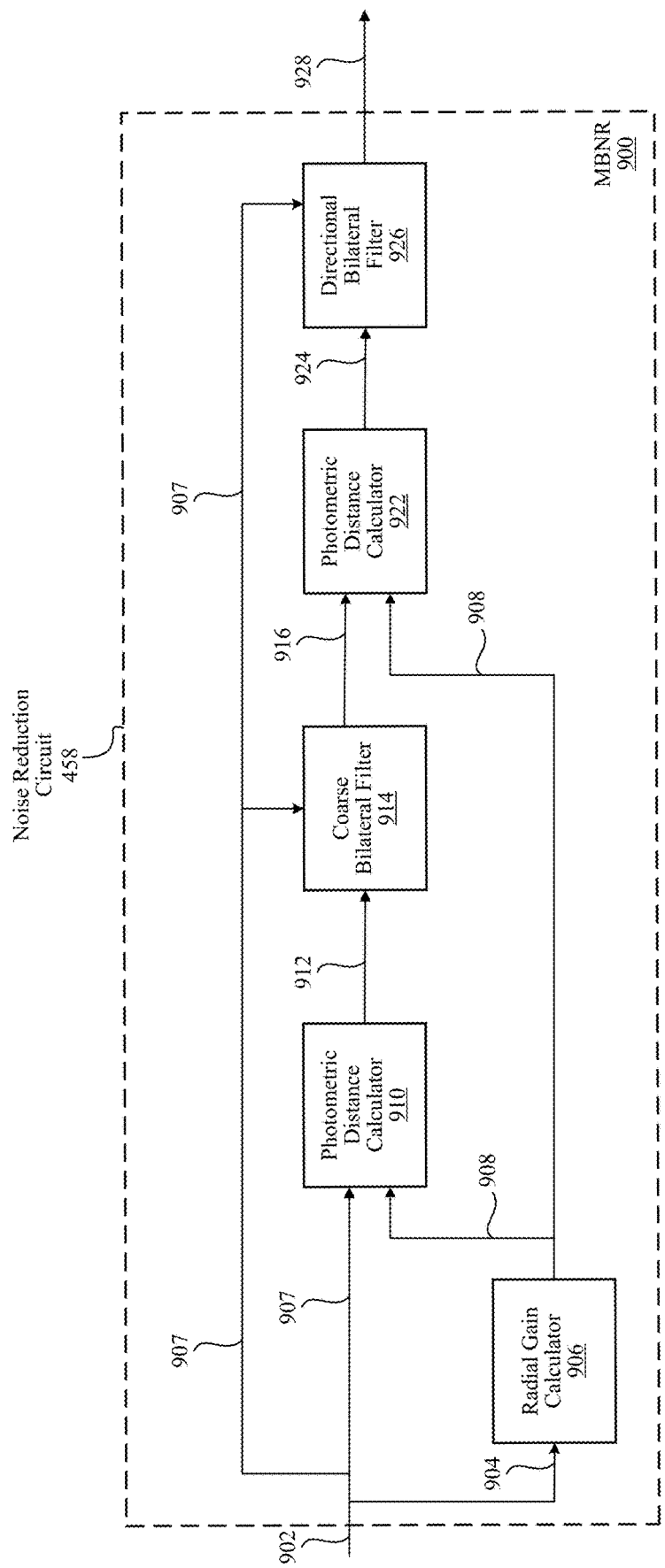
FIG. 9 is a block diagram illustrating an MBNR circuit of the noise reduction circuit, in accordance with some embodiments.

FIG. 9 is a block diagram illustrating an MBNR circuit of the noise reduction circuit, in accordance with some embodiments. The MBNR circuit 900 performs noise reduction on the unscaled level of an image pyramid (e.g., the unscaled top-level image 454 of the fused image pyramid 452), and comprises a radial gain calculator 906, photometric distance calculator 910, coarse bilateral filter 914, photometric distance calculator 922, and directional bilateral filter circuit 926.

In some embodiments, prior to filtering, the MBNR circuit 900 receives high frequency component of the fused unscaled image (e.g., $HF^Y(0)_f$ or $HF^{Raw}(0)_f$), and reconstructs unscaled top-level image 454 (e.g., $F^Y(0)$ in processed image mode or $F^{Raw}(0)$ in raw image mode) by accumulating the received high frequency component data with an upscaled noise reduced version of the image of the previous downscaled level (e.g., noise-reduced version of F(1)). In other embodiments, this reconstruction is performed at image fusion processor 450 instead of the MBNR circuit 900 (e.g., accumulation of $HF^Y(0)_f$ or $HF^{Raw}(0)_f$ with upscaled previous level fused image 876 or 976 to generate unscaled top-level image 454, as illustrated in FIGS. 6B and 7).

Radial gain calculator 906 determines a radial gain 908 for each pixel of the image data 902 received by the MBNR circuit 900 (e.g., corresponding to the scale 0 image 454 of the fused image pyramid 452) as a function of a spatial location 904 of the pixel. A radial gain is used to compensate any spatial gain applied to pixel values in an image processing pipeline up to MBNR circuit 900, e.g., to perform lens shading correction. Radial gain 908 determined by radial gain calculator 906 is passed onto photometric distance calculators 910 and 922. Photometric distance calculator 910 determines photometric distances 912 (e.g., Mahalanobis distances) between a pixel and other pixels in a block of pixels of image data 902 by processing pixel values 907 of the block. As used herein, the block of pixels (or pixel block) corresponds to pixels that are within a defined spatial distance from the pixel that represents a center pixel in the block (e.g., 5×5 pixels).

In some embodiments, the photometric distance calculator 910 determines distances between a center pixel P(j,i) and a neighboring pixel P(j+v,i+h) within the pixel block, where the inverse standard deviation (invStd) of the luminance (for processed image mode) or raw component data (for raw image mode) are scaled in accordance with their v and h offsets. In addition, the photometric distance calculator may adjust the inverse noise standard deviation (invStd) based on the confidence values associated with the received image data. In some embodiments, the photometric distance calculator 910 stores scale values for pixels in the pixel block for which distances are determined (e.g., in a look-up table (LUT)). In some embodiments, the photometric distance calculator stores only scale values for pixels of a particular quadrant (e.g., bottom-right quadrant), where scales for pixels of remaining quadrants are obtained using symmetry. In processed image mode, each pixel of the pixel block has a value corresponding to a luminance value for the pixel. On the other hand, in raw image mode, the values of the pixels surrounding the central pixel correspond to different color components. As such, the photometric distance calculator 910 uses a different set of pixels of the quadrant for calculating photometric distances, based on the operating mode (e.g., processed image mode or raw image mode) of the image fusion circuit, as well as, when in raw image mode, the color of the center pixel.

Figure 10A:
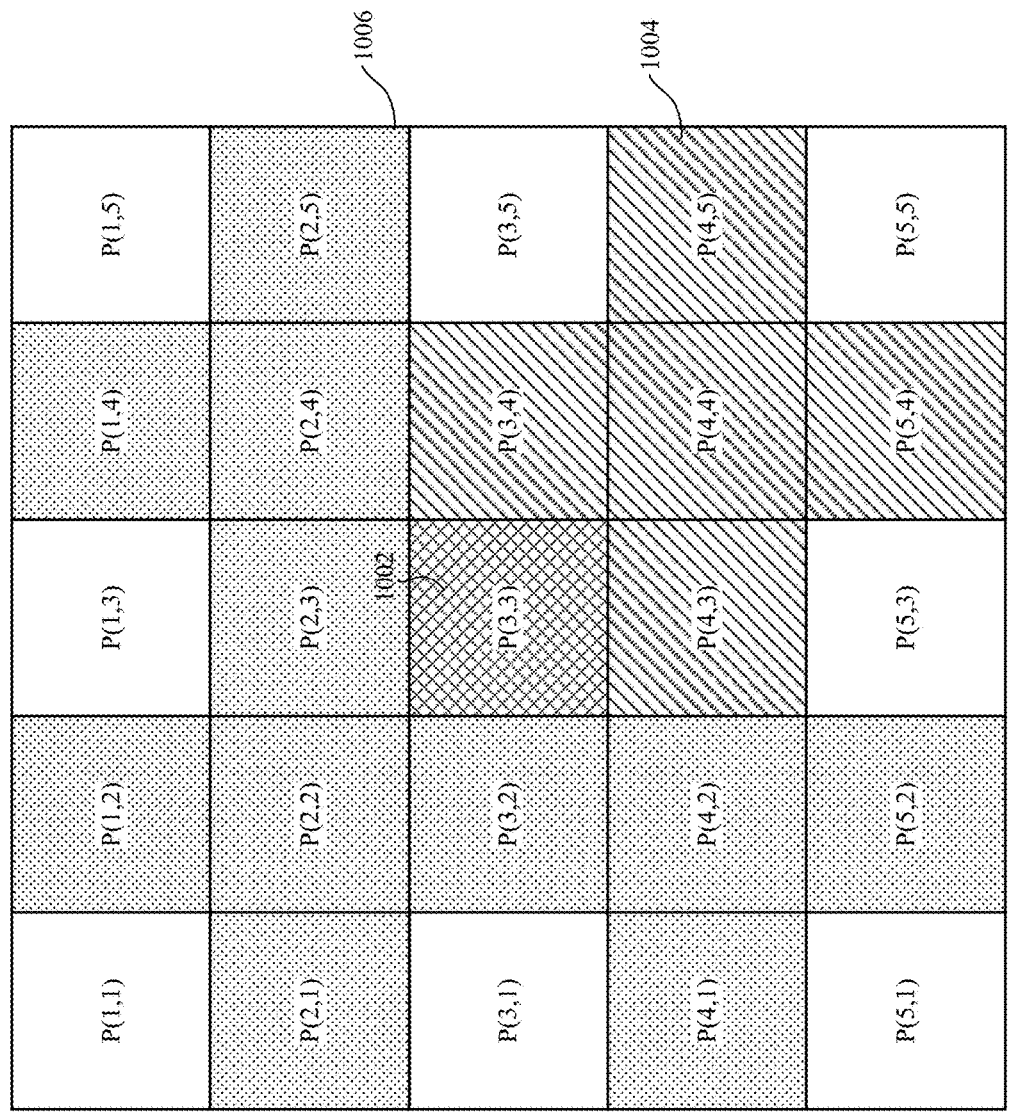
FIG. 10A is a diagram illustrating pixels used for determining photometric distances in processed image mode, in accordance with some embodiments.
Figure 10B:
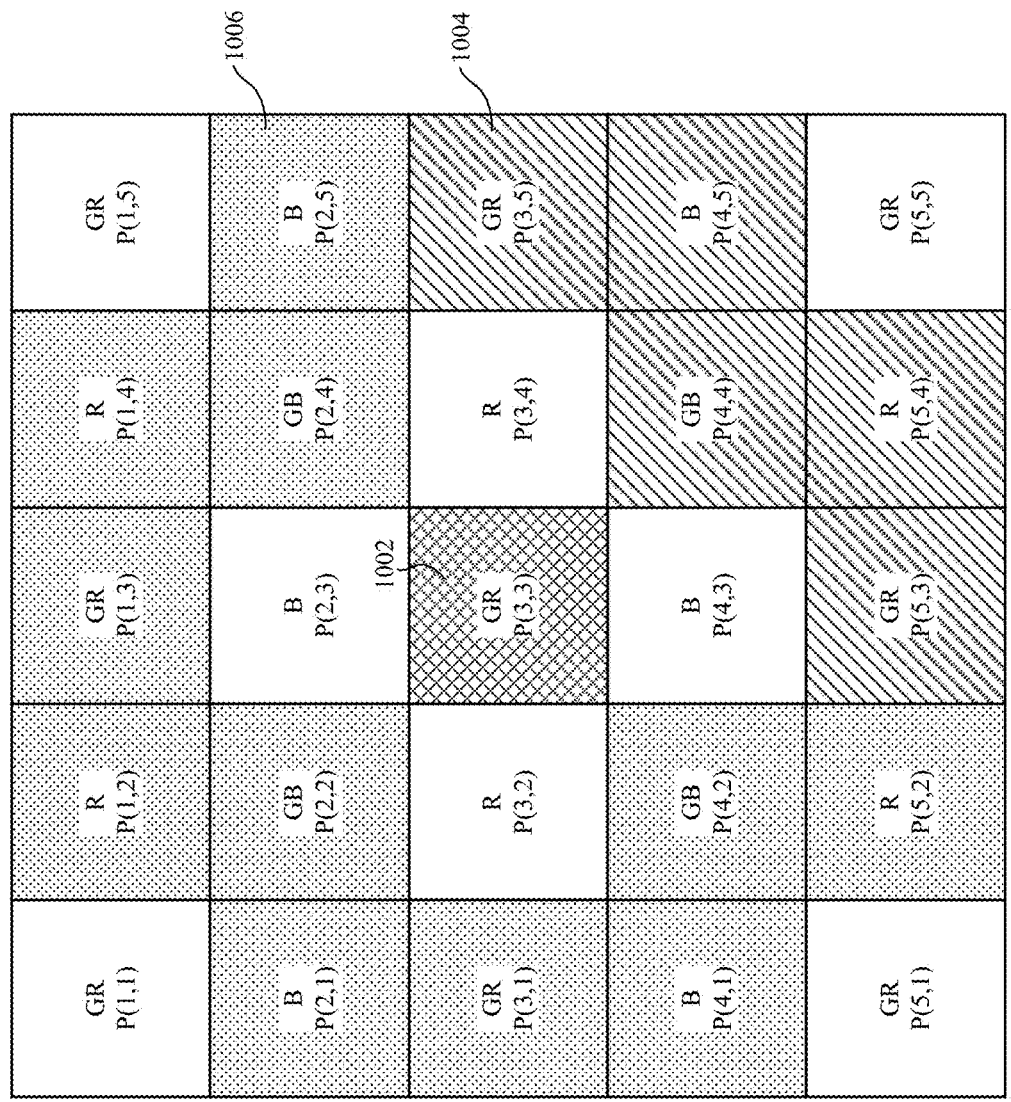
FIG. 10B is a diagram illustrating pixels used for determining photometric distances in raw image mode, where the center pixel is a green pixel, according to one embodiment.
Figure 10C:
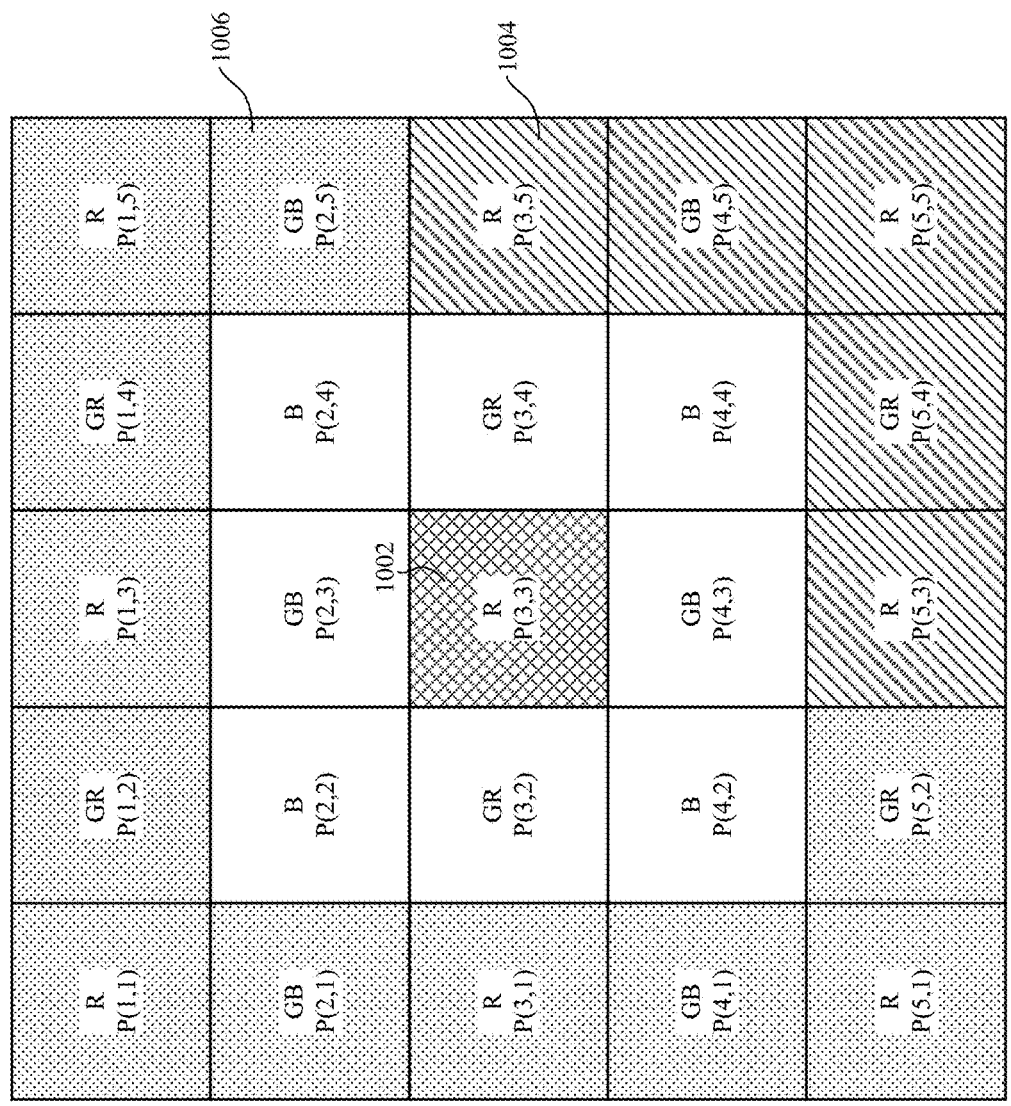
FIG. 10C is a diagram illustrating pixels used for determining photometric distances in raw image mode, where the center pixel is a non-green pixel, according to one embodiment.

FIGS. 10A-10C are diagrams of pixels used for determining photometric distances for different operating modes, in accordance with some embodiments. In the examples illustrated in FIGS. 10A-10C, a pixel block comprises a 5×5 block of pixels surrounding a center pixel 1002. Each pixel may be indicated using a pixel coordinate P(i,j), where i and j are integers between 1 and 5, and the center pixel 1002 corresponds to pixel P(3,3). The photometric distance calculator 910 stores scale values for pixels 1004 of the bottom-right quadrant, which are used to obtain, using symmetry, scales for pixels 1006 of remaining quadrants, where the photometric distance calculator 910 calculates distances between the center pixel 1002 and the set of pixels 1004 and 1006.

Figure 11:
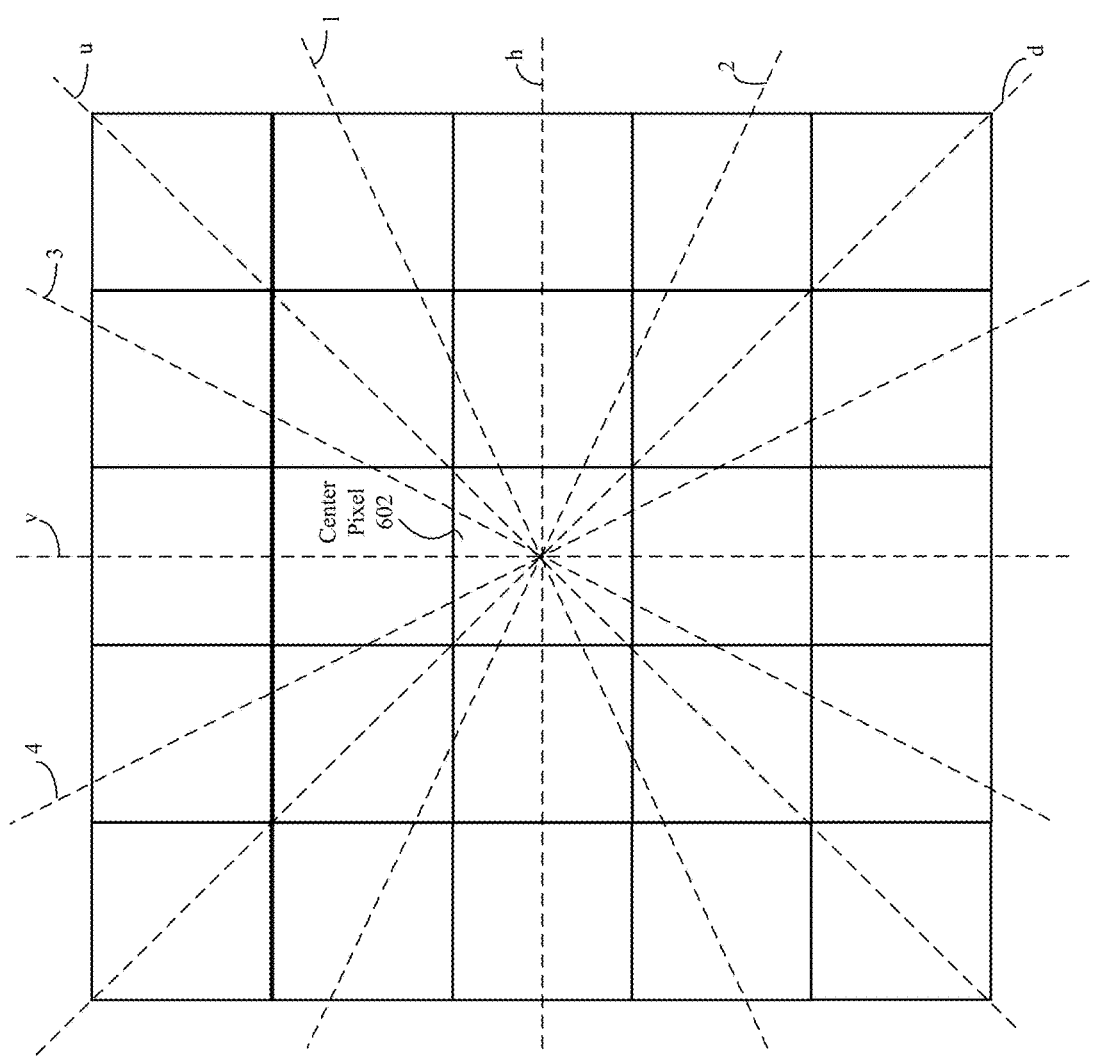
FIG. 11 is a conceptual diagram illustrating possible edge directionality for a pixel in an image, according to one embodiment.

When the pixels 1004 of the quadrant are used to obtain pixels 1006 for the remaining quadrants of the pixel block using symmetry, the total obtained pixels 1004 and 1006 comprise two pixels corresponding to each of a set of eight edge directions. FIG. 11 is a conceptual diagram illustrating possible edge directionality for a pixel in an image, according to one embodiment. As illustrated in FIG. 11, the eight edge directions correspond to a horizontal line (h), a vertical line (v), an upward diagonal line (u), a downward diagonal line (d), a first upward diagonal line (1) at +22.5° relative to the horizontal line, a second downward diagonal line (2) at −22.5° relative to the horizontal line, a third upward diagonal line (3) at +67.5° relative to the horizontal line, and a fourth downward diagonal line (4) at −67.5° relative to the horizontal line.

FIG. 10A is a diagram of pixels used for determining photometric distances in processed image mode, in accordance with some embodiments. As shown in the illustrated embodiment, the selected pixels 1004 for which photometric distances are calculated include all pixels in the quadrant within a 3×3 block surrounding the center pixel 1002, as well as two additional pixels outside the 3×3 that are not along the same row, column, or diagonal as the center pixel 1002. In some embodiments, these five pixels are selected to correspond to five edge directions: horizontal (h), vertical (v), downward diagonal (d), downward diagonal line (2) at −22.5° relative to the horizontal line, and downward diagonal line (4) at −67.5° relative to the horizontal line. When replicated using symmetry, the total obtained pixels 1004 and 1006 comprise two pixels corresponding to each of the set of eight edge directions.

In raw image mode, each pixel of the pixel block corresponds to a particular color channel, i.e., red (R), blue (B), or green (Gr or Gb). FIG. 10B is a diagram of pixels used for determining photometric distances in raw image mode, where the center pixel is a green pixel, in accordance with some embodiments. As illustrated, the selected pixels 1004 comprise three nearest green along the same row, column, and diagonal, respectively, as the center pixel 1002, and two additional pixels non-green pixels that are not along the same row, column, or diagonal as the center pixel. Similar to as discussed above, these five pixels are selected to correspond to the set of five edge directions, such that the total pixels of the pixel block used for calculating photometric distances comprises two pixels for each of the eight directions illustrated in FIG. 11. Although FIG. 10B illustrates a Gr green pixel as the center pixel 1002, it is understood that the same arrangement of pixels of the pixel block may be used for Gb center pixels.

FIG. 10C is a diagram of pixels used for determining photometric distances in raw image mode, where the center pixel is a red or blue pixel, in accordance with some embodiments. Although FIG. 10C illustrates a red pixel as the center pixel 1002, it is understood that the same arrangement of pixels of the pixel block may be used for blue center pixels. As illustrated, the selected pixels 1004 comprise three nearest same-color pixels along the same row, column, and diagonal, respectively, as the center pixel 1002, and two additional pixels located between the same-color pixels, and are not along the same row, column, or diagonal as the center pixel. Similar to as discussed above, these five pixels are selected to correspond to the set of five edge directions, such that the total pixels of the pixel block used for calculating photometric distances comprises two pixels for each of the eight directions illustrated in FIG. 11.

Photometric distances 912 determined by photometric distance calculator 910 are passed to coarse bilateral filter 914. Coarse bilateral filter 914 determines coarse filter coefficients by processing photometric distances 912. Coarse bilateral filter 914 performs summation of products of coarse filter coefficients and corresponding pixel values 907 of the center pixel and the other pixels in the block to generate coarse filtered pixel value 916 for the center pixel. In some embodiments, in processed image mode, the coarse bilateral filter 914 performs summation of products using pixels within a 3×3 block of the center pixel. On the other hand, in raw filter mode, the coarse bilateral filter uses, for red or blue pixels, the 3×3 set of same color neighborhood pixels within a 5×5 block of the center pixel, and for green pixels, a 45-degree rotated set of 3×3 pixels within a 5×5 block of the center pixel (e.g., forming a diamond-shaped array of pixels).

Coarse filtered pixel value 916 is passed onto photometric distance calculator 922. Photometric distance calculator 922 determines refined photometric distances 924 (e.g., Mahalanobis distances) between the center pixel and the other pixels in the block by processing coarse filtered pixel values 916 for the center pixel and the other pixels in the block and corresponding radial gains 908 for the pixels in the block. In some embodiments, the photometric distance calculator 922 determines photometric distances in the same manner as the photometric distance calculator 910, except that it uses the coarse filtered image data 916 where the center pixel of each pixel block is filtered, instead of the unfiltered image data 902.

Refined photometric distances 924 are passed onto directional bilateral filter circuit 926 for directional filtering. Directional bilateral filter circuit 926 determines directional filter coefficients for the center pixel and the other pixels in the block by processing refined photometric distances 424. Directional bilateral filter circuit 926 performs summation of products of the directional filter coefficients and corresponding pixel values 907 of the block to generate filtered pixel value 928 for a pixel in a filtered image. Directional bilateral filter circuit 926 improves noise reduction along edges thus producing cleaner and better defined edges in the filtered image.

In some embodiments, the directional bilateral filter circuit 926 modifies the computed photometric differences using edge and gradient detection for the pixel block, discussed in greater detail below, to determine directional taps for the directional bilateral filter circuit 926, and non-directional spatial coefficients to determine non-directional taps. The directional and non-directional taps may be blended to determine the final filter taps for the directional bilateral filter circuit 926. In addition, the values of the determined taps may be adjusted based on confidence values associated with the image data.

In some embodiments, the directional bilateral filter circuit 926 comprises an edge detection circuit that performs edge detection to detect an edge in the block of pixels. Pixels that are located on the edge that includes the center pixel may obtain more weight (e.g., higher filter coefficients) in bilateral filtering. The directional bilateral filter circuit 926 determines set of direction values for a set of edge directions by processing absolute differences between center pixel value and each pixel value of other pixels in the block of pixels and absolute differences between certain pairs of pixels values, where each direction value represents a likelihood that the block of pixels is part of an edge extending in one of the set of edge directions. The directional bilateral filter circuit 926 determines an edge direction for the block of pixels by comparing set of direction values.

The direction values may correspond to each of a set of directions, e.g., the set of eight directions illustrated in FIG. 11. In one embodiment, the edge detection circuit of the directional bilateral filter circuit computes the following direction values (also referred to as energy parameters) $E_h$, $E_v$, $E_u$, $E_d$, $E_1$, $E_2$, $E_3$, $E_4$, each representing energy along a respective direction: horizontal direction, a vertical direction, an upward diagonal direction, a downward diagonal direction, a first upward diagonal direction, a second downward diagonal direction, a third upward diagonal direction, and a fourth downward diagonal direction respectively. In some embodiments, in processed image mode, the directional bilateral filter 926 determines the energy parameters according to following equations (1):

$$Eh=(D33\_32+D33\_34+D23\_22+D23\_24+D43\_42+D43\_44)>>3$$

$$Ev=(D33\_23+D33\_43+D32\_22+D32\_42+D34\_24+D34\_44)>>3$$

$$Eu=\{D33\_24+D33\_42+D32\_23+D34\_43+(D32\_41+D23\_14+D34\_25+D43\_52)>>1\}>>3$$

$$Ed=\{D33\_22+D33\_44+D32\_43+D34\_23+(D32\_21+D43\_54+D34\_45+D23\_12)>>1\}>>3$$

$$E1=(D33\_25+D33\_41+D23\_15+D23\_31+D43\_35+D43\_51)>>3$$

$$E2=(D33\_21+D33\_45+D23\_11+D23\_35+D43\_31+D43\_55)>>3$$

$$E3=(D33\_14+D33\_52+D32\_13+D32\_51+D34\_15+D34\_53)>>3$$

$$E4=(D33\_12+D33\_54+D32\_11+D32\_53+D34\_13+D34\_55)>>3 \quad (1)$$

where Dij_mn indicates the absolute pixel luma value difference between pixels P(i,j) and P(m,n) (i, j, m, n are integers from 1 to 5 if 5×5 pixel block used and P(3,3) is the center pixel). Direction values (or the energy parameters) obtained by Equations 1 through 8 are then compared to determine an edge direction. The directional bilateral filter circuit 926 uses the obtained edge direction to determine directional filter taps for each pixel of the pixel block. In some embodiments, the directional bilateral filter circuit 926 determines a confidence value for the edge based on a comparison of the obtained energy parameters, indicating a likelihood that the pixel block is part of an edge of the determined direction.

In raw image mode, the edge detection circuit analyzes pixels for determining the energy parameters (e.g., as illustrated in FIGS. 10B and 10C) that include pixels that are not of the same color as the center pixel. For example, as illustrated in FIG. 10B, for a green center pixel P(3,3), pixels P(3,5), P(4,4), and P(5,3) are green pixels, while pixels P(4,5) and P(5,4) are non-green pixels. In order to make use of the pixels P(4,5) and P(5,4) when determining directional values (e.g., E2, E4), the edge detection circuit determines a green value for each of the non-green pixels by interpolating values of two neighboring green pixels (e.g., as an average of the green values of the two neighboring pixels that are on opposite sides of the non-green pixel). For example, a green value of P(4,5) is determined by interpolating values of green pixels P(3,5) and P(5,5), while a green value of P(5,4) is determined by interpolating values of green pixels P(5,3) and P(5,5). Similar techniques may be used to determine color values of non-same color pixels when analyzing pixel blocks where the center pixel is red or blue. For example, in the embodiment illustrated in FIG. 10C, a red value for the non-red pixel P(4,5) may be determined by interpolating the red values of pixels P(3,5) and P(5,5).

In some embodiments, in raw image mode, the directional bilateral filter 926 determines the energy parameters according to following equations (2):

$$Eh=(D32\_34+(D33\_31+D33\_35+D22\_24+D42\_44)/2+(D23\_21+D23\_25+D43\_41+D43\_45)/4)/4;$$

$$Ev=(D23\_43+(D33\_13+D33\_53+D22\_42+D24\_44)/2+(D32\_12+D32\_52+D34\_14+D34\_54)/4)/4;$$

$$Eu=(D24\_42+(D33\_15+D33\_51+D23\_41+D43\_25+D32\_14+D34\_52)/2)/4$$

$$Ed=(D22\_44+(D33\_11+D33\_55+D23\_45+D43\_21+D32\_54+D34\_12)/2)/4$$

$$E1=(D33\_1535+D33\_3151+D23\_2141+D43\_2545+D32\_1434+D34\_3252+D24\_2242+D42\_2444)/8$$

$$E2=(D33\_1131+D33\_3555+D23\_2545+D43\_2141+D32\_3454+D34\_1232+D22\_2444+D44\_2242)/8;$$

$$E3=(D33\_1315+D33\_5153+D23\_4143+D43\_2325+D32\_1214+D34\_5254+D24\_4244+D42\_2224)/8$$

$$E4=(D33\_1311+D33\_5553+D23\_4543+D43\_2321+D32\_5254+D34\_1214+D22\_4244+D44\_2224)/8 \quad (2)$$

where Dij_mn indicates the absolute pixel color value difference between pixels P(i,j) and P(m,n), and Dij_mnop indicates the pixel color value difference between the pixel P(i,j) and an interpolation of pixels P(m,n) and P(o,p) (e.g., corresponding to an interpolated color value of a non-same color pixel located between pixels P(m,n) and P(o,p)).

In some embodiments, the directional bilateral filter 926 further comprises a gradient detection circuit configured to determine whether the center pixel is on a gradient. Some pixels along a line in the pixel block are on the gradient when these pixels are on a gradually increasing or decreasing slope below a threshold with no change in a gradient direction. Whether a pixel is on such location or not is determined by comparing pixel value differences along lines (e.g., lines v, u, h, d, 1, 2, 3, 4 shown in FIG. 11). In addition, the gradient detection circuit may determine a likelihood (e.g., a confidence value) is that the pixel block is part of the detected gradient, based upon the comparison. In some embodiments, pixels on a gradient may obtain more weight (e.g., higher filter coefficients) in bilateral filtering. The purpose of gradient detection is to reduce posterization effect after bilateral noise filtering. In some embodiments, the gradient detection circuit determines whether the pixel block contains a gradient by analyzing real color values of neighboring pixels of the pixel block (e.g., without interpolating color values of a pixel based on adjacent pixels).

The directional bilateral filter circuit 926 comprises a tap calculation circuit that determines directional taps for each pixel of image data based upon the edge direction determined by the edge detection circuit, the gradient determined by the gradient detection circuit, and their respective confidence values/weights, e.g., where pixels on the determine edge and/or gradient are associated with higher tap values. In some embodiments, the directional tap value of pixel is calculated based upon the photometric distance of the pixel, modified by whether the pixel is on a gradient and/or edge.

In some embodiments, the tap calculation circuit of the directional bilateral filter circuit 926 further determines non-directional taps for each pixel of the block. In some embodiments, non-directional taps for each pixel are determined based upon predetermined non-directional spatial coefficients NFcoeff_cc and a photometric factor Phi_cc for the color component based upon the computed photometric distance for the pixel, wherein "cc" can refer to a color component being processed (e.g., Y for processed image mode, or R, G, or B for raw image mode). In some embodiments, the non-directional spatial coefficients NFcoeff are stored in respective coefficient arrays corresponding to respective color channels (e.g., for raw image mode, a first coefficient array corresponding to green pixels, and a second coefficient array corresponding to red/blue pixels).

Figure 12:
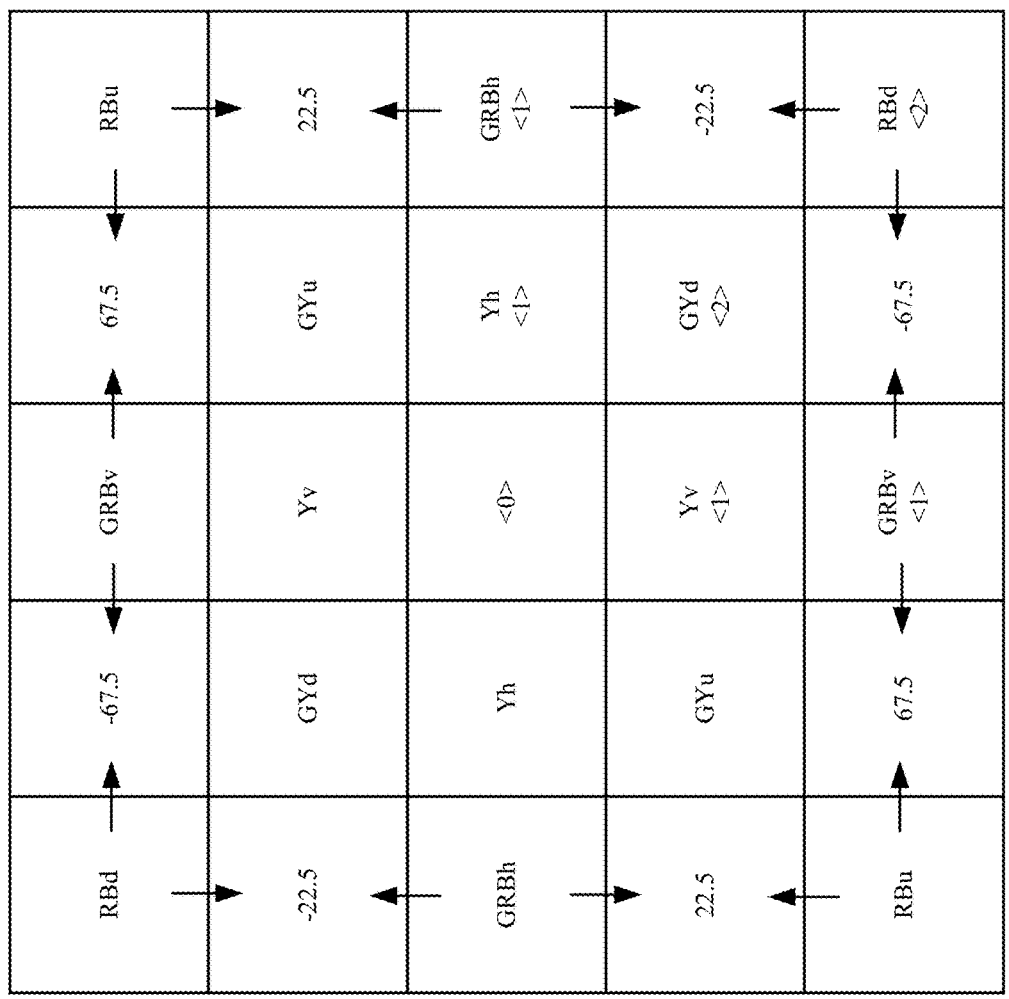
FIG. 12 is a diagram illustrating how different pixels in a pixel block are used for determining a filter kernel for a directional bilateral filter in different operating modes, in accordance with some embodiments.

FIG. 12 is a diagram illustrating how different pixels in a pixel block are used for determining a filter kernel for a directional bilateral filter in different operating modes, in accordance with some embodiments. FIG. 12 shows a filter kernel for processed image mode (YCC) and raw image mode. The pixels shown in FIG. 12 are labelled Y for luma in processed image mode, and/or R, G, or B corresponding to the three colors in raw image mode (Gr and Gb are considered as same color). The labels h, v, u and d indicate the pixels in the horizontal, vertical, up diagonal and down diagonal direction, respectively. For example, GYu indicates the pixel is used for filtering center pixel G in raw mode or luma in YCC mode and it is in the up diagonal direction (e.g., will be weighed more heavily if the edge direction is determined to correspond to the up diagonal direction).

In addition, the numbers <n> inside certain pixels shown in FIG. 12 indicate an index into a filter coefficient array NFcoeff or NFcoeffRB used for determining non-directional taps for the pixel block. In some embodiments, non-directional taps are determined based on pixel values of pixels along the horizontal, vertical, and diagonal directions, and not pixels that are along an off-diagonal direction (e.g., pixels (4,5), (5,4), etc.). While FIG. 12 only illustrates indices for non-directional spatial coefficients for pixels in the lower-right quadrant of the pixel block, it is understood that indices for other pixels of the block may be obtained through symmetry.

The pixels marked with off diagonal direction (e.g., 22.5, −22.5, 67.5, or −67.5) are the two extra pixels used for the off diagonal direction filtering. In raw image mode, the real pixels in those locations are different colors from the center pixel, and are replaced with interpolated values (e.g., average value) of two neighboring pixels that are the same color as the center pixel, as indicated by the arrows in the figure. In addition, a confidence value for the interpolated pixel may be determined as an interpolation (e.g., average) of confidence values of the two neighboring pixels.

The tap calculation circuit of the directional bilateral filter 926 determines filter taps for pixels in the block based on direction and/or gradient of pixel block, as well as any non-directional taps for the block. In some embodiments, the tap calculator circuit blends corresponding directional taps and non-directional taps to generate final taps for each pixel. In some embodiments, the directional and non-directional taps are blended based upon determined confidence values indicating a likelihood that the pixel block is located along the determined directional edge and/or gradient.

The directional bilateral filter 926 performs summation of products of determined filter taps and corresponding pixel values of the center pixel and the other pixels in the block to generate directional filtered pixel value for the center pixel. In some embodiments, the directional bilateral filter 926 performs summation of products using the set of pixels of the surrounding pixel block based upon the operating mode of the image fusion circuit 400 and the color of the center pixel (e.g., as illustrated in FIGS. 10A-10C). In raw image mode, pixel values for pixels not of the same color as the center pixel are determined by interpolating the pixel values of two neighboring same-color pixels, e.g., as shown in FIG. 12. In some embodiments, the summation of products of determined filter taps and corresponding pixel values is performed by a sum of product calculator circuit of the directional bilateral filter 926.

Thus, MBNR circuit 900 receives image data corresponding to an unscaled top-level image of a fused image pyramid, and, based on the operating mode of the image fusion circuit, analyzes different pixels of a pixel block associated with each pixel of the received image data (e.g., a 5×5 pixel block surrounding each center pixel). In addition, in raw image mode, the MBNR determines, for a given center pixel, which pixels of the pixel block to analyze based upon the color of the center pixel. The pixels may comprise a plurality of pixels of the same color as the center pixel, and one or more additional pixels of a different color from the center pixel. For the purposes of determining filter tap values and filtered pixel values, pixel values corresponding to the color of the center pixel are determined for each of the one or more additional pixels, based upon pixel values of two or more adjacent same-color pixels. The MBNR circuit 900 thus generates a filtered pixel value for each pixel in a filtered image, in either processed image mode or raw image mode.

Figure 13:
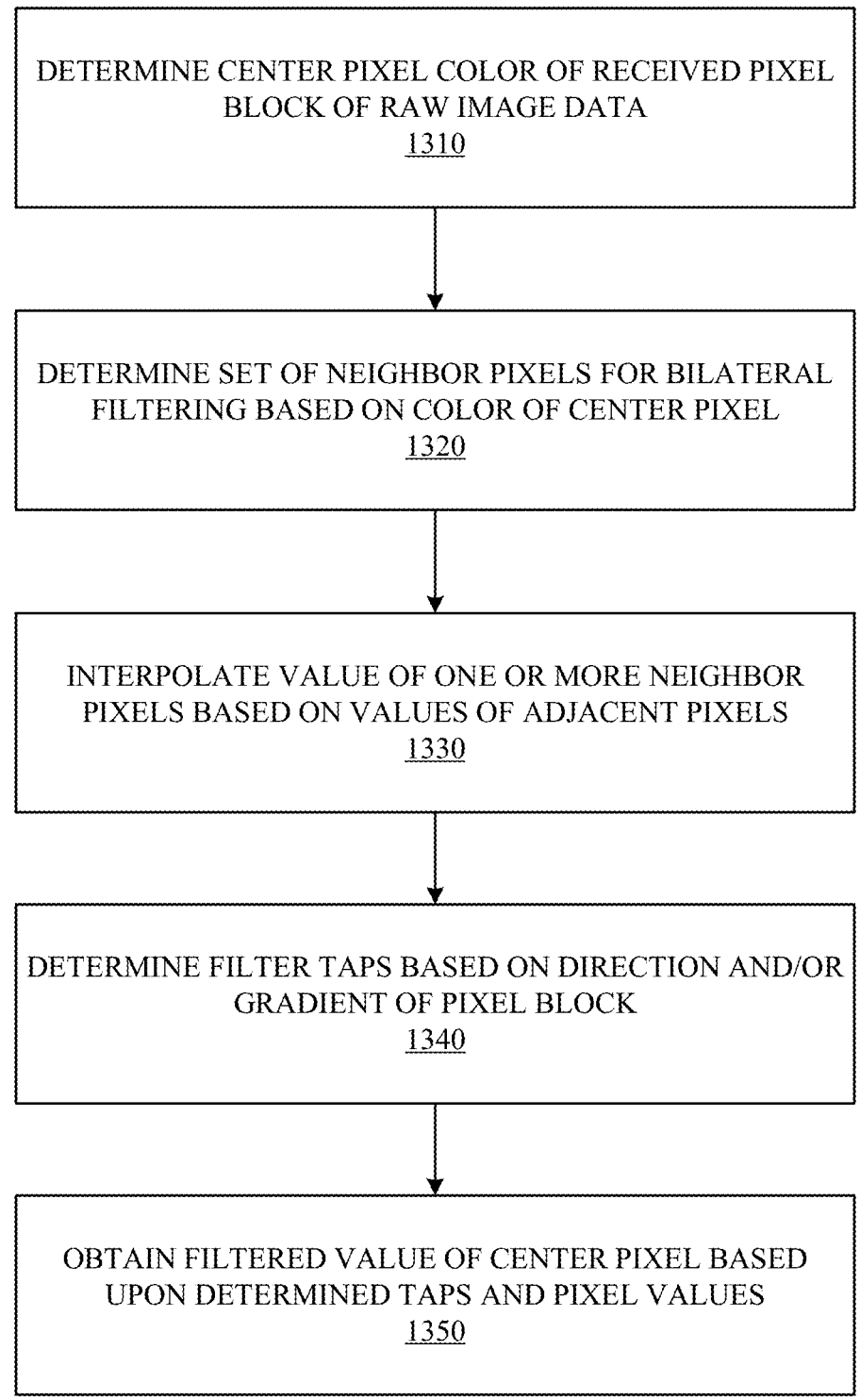
FIG. 13 is a flowchart of a process for performing bilateral filtering on received raw image data in raw image mode, in accordance with some embodiments.

FIG. 13 is a flowchart of a process for performing bilateral filtering on received raw image data in raw image mode, in accordance with some embodiments. The process 1300 may be performed by an MBNR circuit, such as the MBNR circuit 900 illustrated in FIG. 9.

The MBNR circuit receives 1310 a pixel block associated with a center pixel, and determines a center pixel color of received pixel block of raw image data. For example, in processed image mode (e.g., YCC mode), the center pixel will always correspond to a luminance component Y. However, in raw image mode, the center pixel may correspond to a red pixel (R), blue pixel (B), or green pixel (Gr or Gb, which may be treated the same for the purpose of bilateral filtering).

The MBNR circuit determines 1320 a set of neighbor pixels for bilateral filtering based on color of center pixel. For example, if the center pixel is green, the set of neighbor pixels may correspond to the set of pixels illustrated in FIG. 10B. On the other hand, if the center pixel is red or blue, the set of neighbor pixels may correspond to the set of pixels illustrated in FIG. 10C. The set of neighbor pixels includes a plurality of pixels of the same color as the center pixel, and one or more neighbor pixels that are of a different color as the center pixel.

The MBNR circuit interpolates 1330, for each of the one or more neighbor pixels that are of a different color as the center pixel, a pixel value for the pixel based on values of two or more adjacent pixels of the same color as the center pixel. In some embodiments, the two or more adjacent pixels correspond to pixels of the set of neighbor pixels (e.g., for red/blue center pixels). For example, as illustrated in FIG. 10C, the color values for pixels P(4,5) and P(5,4) may be determined by interpolating pixels P(3,5) and P(5,5), and pixels P(5,3) and P(5,5) respectively, where pixels P(3,5), P(5,3), and P(5,5) are part of the set of neighbor pixels used for bilateral filtering of the center pixel. In other embodiments, the two or more adjacent pixels includes at least one pixel of the pixel block not part of the set of neighbor pixels (e.g., for green center pixels). For example, as illustrated in FIG. 10B, the color values for pixels P(4,5) and P(5,4) may be determined by interpolating pixels P(3,5) and P(5,5), and pixels P(5,3) and P(5,5) respectively, where pixels P(5,3) and P(3,5) are part of the set of neighbor pixels used for bilateral filtering of the center pixel, while pixel P(5,5) is not.

The MBNR circuit determines 1340 filter taps based on direction and/or gradient of pixel block, by analyzing the set of neighbor pixels. For example, in some embodiments, a directional bilateral filter circuit of the MBNR circuit determines an energy parameter for each of a set of edge directions, based on pixel values of the set of neighbor pixels. The determined energy parameters are compared to determine an edge direction of the pixel block, which is used to determine the directional filter taps for the pixel block. The determined energy parameters may further be compared to determine an edge confidence value for blending the directional filter taps with one or more non-directional taps to determine a final tap value for each pixel of the set of neighbor pixels.

The MBNR circuit determines 1350 a filtered value of the center pixel based upon determined taps and pixel values of the set of neighbor pixels. In some embodiments, the directional bilateral filter circuit of the MBNR circuit calculates a summation of products of the determined filter taps and corresponding pixel values of the center pixel and the pixels in the set of neighbor pixels to generate a directional filtered pixel value for the center pixel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A noise reduction circuit, comprising:
    a photometric distance calculator circuit configured to determine distances between a center pixel of a pixel block to a set of neighbor pixels of the pixel block, the pixel block comprising raw image data associated with a raw image, wherein the center pixel is of a first color channel, and wherein the set of neighbor pixels is selected from the pixel block based upon the first color channel, and comprises one or more pixels of a color channel other than the first color channel; and
    a bilateral filter circuit coupled to the photometric distance calculator circuit and configured to:
        analyze color values of the set of neighbor pixels to determine an edge direction of a set of edge directions associated with the pixel block, wherein a color value of each pixel of the one or more pixels of the set of neighbor pixels of the color channel other than the first channel is determined by interpolating color values of at least two adjacent pixels of the pixel block that are of the first color channel;
        determine a set of filter taps for the set of neighbor pixels by processing the edge direction and one or more of the distances determined by the photometric distance calculator circuit; and
        apply the determined set of filter taps to corresponding color values of the set of neighbor pixels to obtain a filtered pixel value of the center pixel.

2. The noise reduction circuit of claim 1, wherein the raw image data comprises Bayer image data.

3. The noise reduction circuit of claim 1, wherein the photometric distance calculator circuit is configured to calculate Mahalanobis distances between the center pixel and pixels of the set of neighbor pixels of the pixel block.

4. The noise reduction circuit of claim 1, wherein the bilateral filter circuit is further configured to:
    detect a gradient in pixels of the pixel block using the set of neighbor pixels; and
    process the detected gradient to determine the set of filter taps.

5. The noise reduction circuit of claim 1, wherein the bilateral filter circuit is further configured to:
    determine, for each of the set of edge directions, a respective energy parameter based on an aggregation of difference values between pairs of pixels of the set of neighbor pixels, wherein the pairs of pixels are selected based upon the first color channel;
    determine a likelihood that the pixel block is part of the edge direction, based upon a comparison of the determined energy parameter values.

6. The noise reduction circuit of claim 1, further comprising:
    a coarse bilateral filter circuit configured to perform bilateral filtering of pixels of the raw image based upon a set of same color pixels surrounding each pixel to generate the pixel block where the center pixel is filtered based on pixel values of one or more other pixels of the pixel block;
    wherein the photometric distance calculator circuit is configured to determine distances between the center pixel of the pixel block to other pixels of the pixel block, where the center pixel of the pixel block corresponds to the filtered center pixel generated by the coarse bilateral filter.

7. The noise reduction circuit of claim 1, wherein the raw image corresponds to a top image of an image pyramid.

8. The noise reduction circuit of claim 1, wherein the center pixel corresponds to a green pixel, and the set of neighbor pixels comprises a set of same color pixels within two pixels of the center pixel, and the one or more pixels of the color channel other than the first color channel located adjacent to the set of same color pixels and further from the center pixel than the set of same color pixels.

9. The noise reduction circuit of claim 1, wherein the center pixel corresponds to a red or blue pixel, and the set of neighbor pixels comprise a 3-by-3 set of nearest same color pixels as the center pixel, and the one or more pixels of the color channel other than the first color channel located between pixels of the 3-by-3 set of same color pixels.

10. The noise reduction circuit of claim 1, wherein a particular color value of a pixel of the one or more pixels is interpolated based upon a first pixel of the set of neighbor pixels, and a second pixel of the pixel block not of the set of neighbor pixels.

11. The noise reduction circuit of claim 1, wherein applying the determined set of filter taps to the corresponding color values of the set of neighbor pixels comprises multiplying the determined set of filter taps with the corresponding color values of the set of neighbor pixels and adding the multiplied values.

12. A method for performing noise reduction on raw image data, comprising:
    receiving raw image data associated with a raw image, comprising at least a pixel block having a center pixel, wherein the center pixel is of a first color channel;
    determining a set of distances between the center pixel of the pixel block to a set of neighbor pixels of the pixel block, wherein the set of neighbor pixels is selected from the pixel block based upon the first color channel, and comprises one or more pixels of a color channel other than the first color channel;
    analyzing color values of the set of neighbor pixels to determine an edge direction of a set of edge directions associated with the pixel block, wherein a color value of each pixel of the one or more pixels of the set of neighbor pixels of the color channel other than the first color channel is determined by interpolating color values of at least two adjacent pixels of the pixel block that are of the first color channel;

determining a set of filter taps for the set of neighbor pixels by processing the edge direction and one or more of the determined set of distances; and applying the determined set of filter taps to corresponding color values of the set of neighbor pixels to obtain a filtered pixel value of the center pixel.

13. The method of claim 12, wherein the raw image data comprises Bayer image data.

14. The method of claim 12, wherein the set of distances includes Mahalanobis distances between the center pixel and pixels of the set of neighbor pixels of the pixel block.

15. The method of claim 12, further comprising:
detecting a gradient in pixels of the pixel block using the set of neighbor pixels;
wherein determining the set of filter taps further comprises processing the detected gradient to determine the set of filter taps.

16. The method of claim 12, further comprising:
performing, at a coarse bilateral filter, bilateral filtering of pixels of the raw image based upon a set of same color pixels surrounding each pixel to generate filtered raw image data to generate the pixel block where the center pixel is filtered based on pixel values of one or more other pixels of the pixel block;
wherein the center pixel of the pixel block corresponds to the filtered center pixel of the generated filtered raw image data.

17. The method of claim 12, wherein the center pixel corresponds to a green pixel, and the set of neighbor pixels comprises a set of same color pixels within two pixels of the center pixel, and the one or more pixels of the color channel other than the first color channel located adjacent to the set of same color pixels and further from the center pixel than the set of same color pixels.

18. The method of claim 12, wherein the center pixel corresponds to a red or blue pixel, and the set of neighbor pixels comprise a 3-by-3 set of nearest same color pixels as the center pixel, and the one or more pixels of the color channel other than the first color channel located between pixels of the 3-by-3 set of same color pixels.

19. The method of claim 12, wherein a particular color value of a pixel of the one or more pixels is interpolated based upon a first pixel of the set of neighbor pixels, and a second pixel of the pixel block not of the set of neighbor pixels.

20. An electronic device, comprising:
a memory; and
an image signal processor having a noise reduction circuit comprising:
a photometric distance calculator circuit configured to determine distances between a center pixel of a pixel block to a set of neighbor pixels of the pixel block, the pixel block comprising raw image data associated with a raw image, wherein the center pixel is of a first color channel, and wherein the set of neighbor pixels is selected from the pixel block based upon the first color channel, and comprise one or more pixels of a color channel other than the first color channel; and
a bilateral filter circuit coupled to the photometric distance calculator circuit and configured to:
analyze color values of the set of neighbor pixels to determine an edge direction of a set of edge directions associated with the pixel block, wherein a color value of each pixel of the one or more pixels of the set of neighbor pixels of the color channel other than the first channel is determined by interpolating color values of at least two adjacent pixels of the pixel block that are of the first color channel;
determine a set of filter taps for the set of neighbor pixels by processing the edge direction and one or more of the distances determined by the photometric distance calculator circuit; and
apply the determined set of filter taps to corresponding color values of the set of neighbor pixels to obtain a filtered pixel value of the center pixel.

* * * * *

UNITED STATES PATENT AND TRADEMARK OFFICE
CERTIFICATE OF CORRECTION

PATENT NO. : 11,816,858 B2
APPLICATION NO. : 17/173094
DATED : November 14, 2023
INVENTOR(S) : Smirnov et al.

Page 1 of 1

It is certified that error appears in the above-identified patent and that said Letters Patent is hereby corrected as shown below:

In the Specification

In Column 2, Line 9, delete "embodiment" and insert -- embodiment. --, therefor.

In Column 14, Line 43, delete "a" and insert -- an --, therefor.

In Column 25, Line 60, delete "HF (N–1)$_1$" and insert -- HF(N–1)$_1$ --, therefor.

In the Claims

In Column 42, Claim 20, Line 19, delete "comprise" and insert -- comprises --, therefor.

Signed and Sealed this
Ninth Day of January, 2024

Katherine Kelly Vidal
*Director of the United States Patent and Trademark Office*